United States Patent [19]
Catipovic et al.

[11] Patent Number: 5,559,757
[45] Date of Patent: Sep. 24, 1996

[54] SPATIAL DIVERSITY PROCESSING FOR UNDERWATER ACOUSTIC TELEMETRY

[76] Inventors: Josko A. Catipovic, 20 McGregor Rd. PO Box 705; Lee E. Freitag, 86 Water St., both of Woods Hole, Mass. 02543

[21] Appl. No.: 195,965

[22] Filed: Feb. 9, 1994

(Under 37 CFR 1.47)

Related U.S. Application Data

[63] Continuation of Ser. No. 41,326, Mar. 31, 1993, abandoned, which is a continuation of Ser. No. 709,574, Dec. 18, 1991, abandoned.

[51] Int. Cl.$^6$ .................................................. H04B 11/00
[52] U.S. Cl. ................................................................. 367/134
[58] Field of Search ...................................... 367/134, 132, 367/130; 340/850, 851; 375/6

[56] References Cited

U.S. PATENT DOCUMENTS 3,422,397  1/1969  Lagoe ........................ 367/134

*Primary Examiner*—Daniel T. Pihulic

[57] ABSTRACT

An underwater acoustic telemetry system uses spatially distributed receivers with aperture sizes from 0.35 to 20 m. Output from each receiver is assigned a quality measure based on the estimated error rate, and the data, weighted by the quality measure, is combined and decoded. The quality measure is derived from a Viterbi error-correction decoder operating on each receiver. The quality estimator exploits the signal and noise differential travel times to individual sensors. The spatial coherence structure of the shallow-water acoustic channel shows relatively low signal coherence at separations as short as 0.35 m. Increasing receiver spacing beyond 5 m offers additional benefits in the presence of impulsive noise and larger scale inhomogeneities in the acoustic field. Diversity combining, even with only two receivers, can lower uncoded error rates by up to several orders of magnitude while providing immunity to transducer jamming or failure.

18 Claims, 13 Drawing Sheets

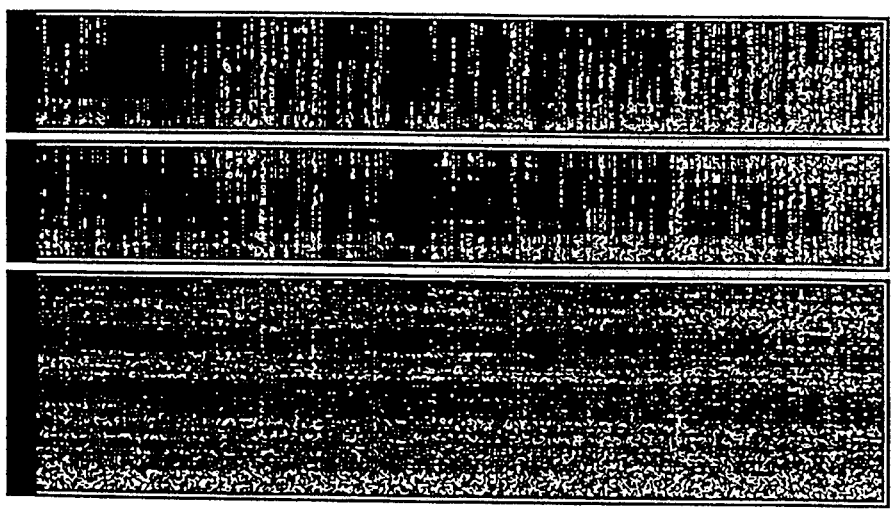
FIG. 9b
FIG. 9c
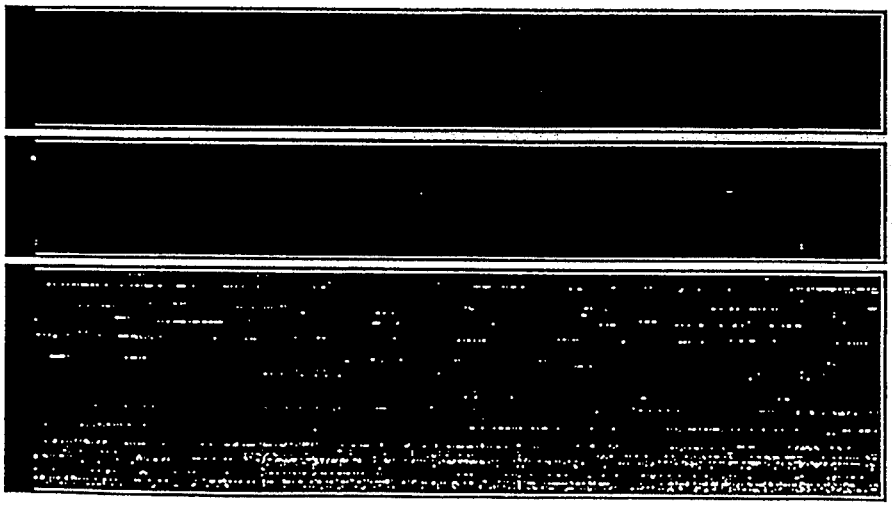
FIG. 9a

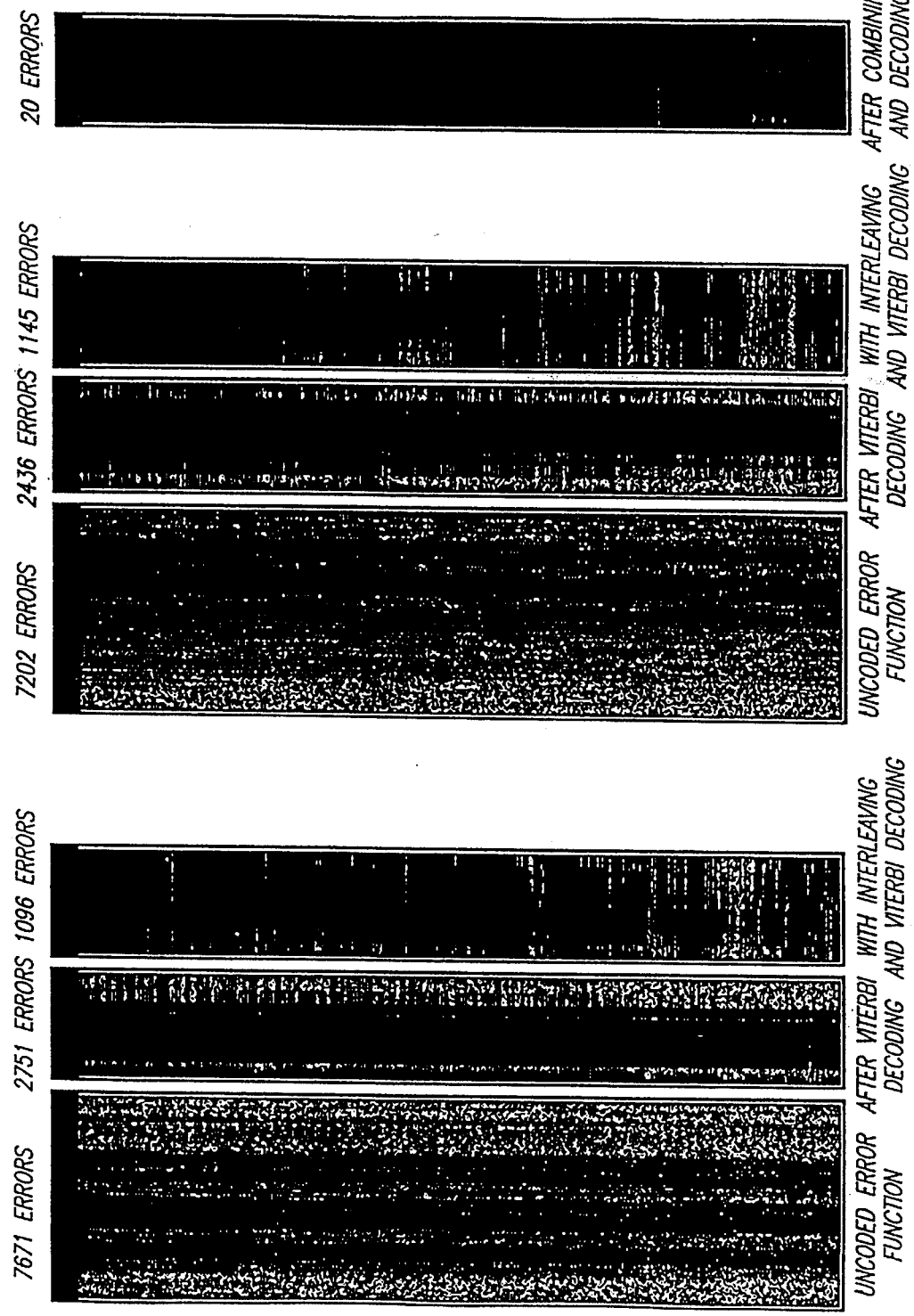

SPATIAL DIVERSITY PROCESSING FOR UNDERWATER ACOUSTIC TELEMETRY

CROSS REFERENCE TO RELATED APPLICATIONS

This is a continuation of U.S. patent application Ser. No. 08/041,326, filed Mar. 31, 1993, now abandoned, which is a continuation of U.S. patent application Ser. No. 07/709,574, filed Dec. 18, 1991, now abandoned.

BACKGROUND OF THE INVENTION

1. Field of Invention

The present invention relates to underwater acoustic telemetry links and, in particular, to high reliability, low error rate systems with fixed data transmission rates.

2. Description of the Prior Art

Increasing the reliability of acoustic telemetry systems that must operate under realistic ocean conditions, and in the presence of a variety of noise and jamming sources, is an important area of underwater communications systems research. Designing a very low error-rate system with a fixed data transmission rate that will operate under all conditions is particularly difficult due to the extensive channel variability and frequent non-Gaussian events such as noisy pile driving, breaking wave bubble clouds, and high ambient turbulence levels. Maintaining continuous contact with a moving Autonomous Underwater Vehicle (AUV), for example, precludes use of highly directional transducers and the received signal-to-noise ratio (SNR) typically is further degraded by own-ship noise or maneuvering turbulence and bubble clouds.

BRIEF DESCRIPTION OF DRAWINGS

FIG. 9A, FIG. 9B, and FIG. 9C are time-frequency error plots illustrating the summation and correction of data from two hydrophones where the data from one hydrophone is of good quality and data from the other is of poor quality.

FIG. 10A, FIG. 10B, and FIG. 10C are time-frequency error plots where both hydrophones are providing fairly poor quality data due to the presence of an approaching motorboat.

SUMMARY OF THE INVENTION

Figure 1:
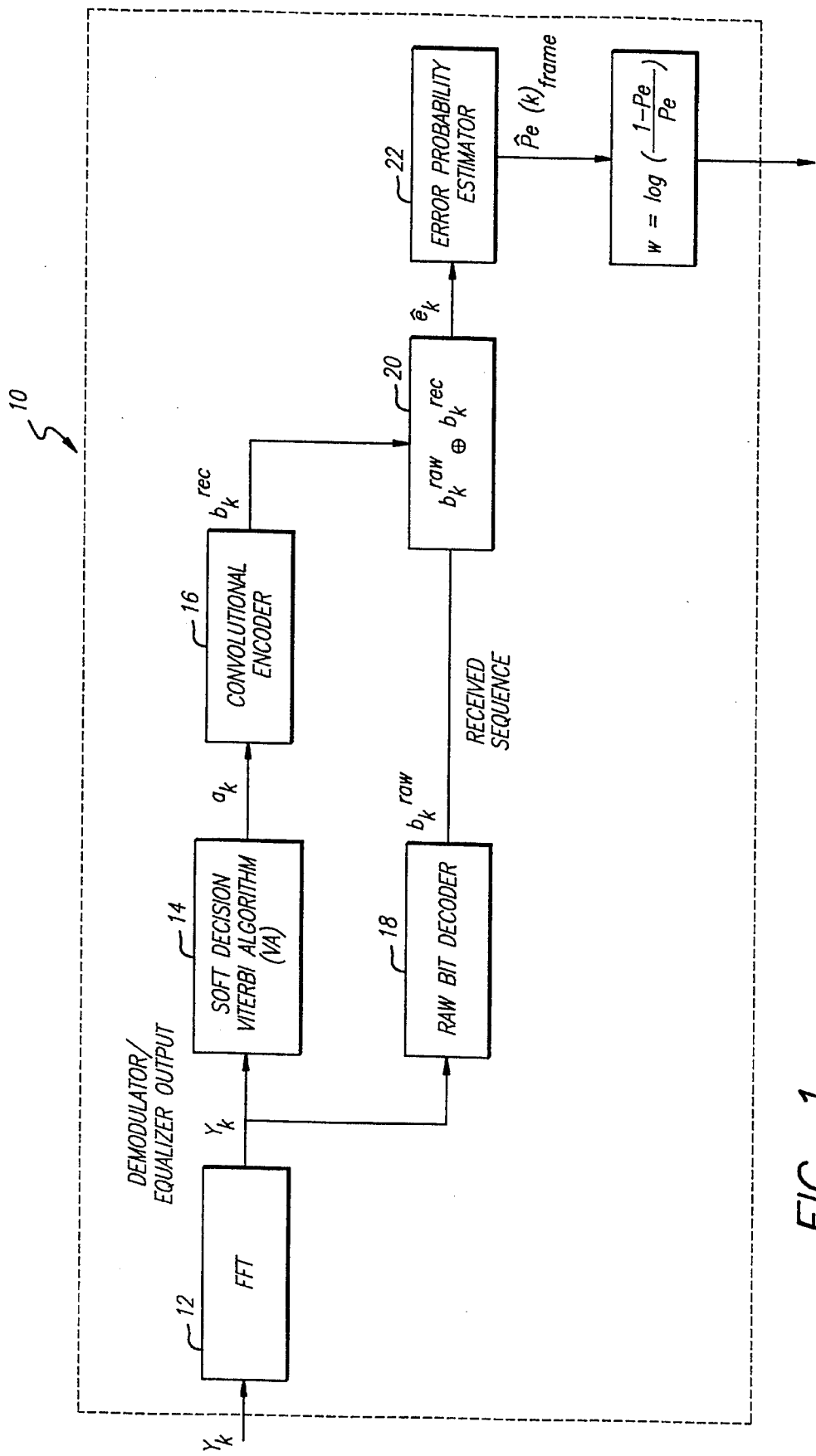
FIG. 1 is a block diagram of an error probability estimator in accordance with the present invention.

In accordance with a first aspect, the present invention provides a large increase in the reliability of shipboard or stationary underwater acoustic telemetry systems by using spatially distributed receivers with aperture sizes, for example, from about 0.35 to 20 m. Output from each receiver is assigned a quality measure based on the estimated error rate and the data, weighted by the quality measure, is combined and decoded. The quality measure is derived from an error-correction decoder, such as a Viterbi algorithm or VA-decoder, operating on each receiver.

In accordance with another aspect, the present invention provides an underwater telemetry system for digital data using multiple, spatially diverse hydrophones, a receiver associated with a first one of the spatially diverse hydrophones for receiving underwater acoustic signals transmitted from an underwater acoustic source along a first path, a receiver associated with a second of the spatially diverse hydrophones for receiving underwater acoustic signals transmitted from the underwater acoustic source along a second, spatially diverse path, an estimator for determining an estimate of the relative reliability of the underwater acoustic signals received along the first and second paths compared to the underwater acoustic signals transmitted by the underwater acoustic source, a scaler for weighting the received underwater acoustic signals in accordance with the reliability estimate, and a processor for combining the weighted underwater acoustic signals for recovering an accurate representation of the underwater acoustic signals transmitted from the underwater acoustic source.

In accordance with another aspect, the present invention provides an underwater telemetry system using a plurality of spatially diverse hydrophones for receiving signals transmitted underwater, an analog processor associated with each of the hydrophones for recovering signals therefrom, a reliability estimator associated with each of the analog processors for estimating the reliability of the signals received by each of the hydrophones, a digital processor for combining the recovered digital signals in accordance with the estimate of reliability associated therewith, and a signal recovery subsystem for correcting the combined recovered digital signals to recovery a replica of the originally transmitted signals.

In a still further aspect, the present invention provides a method of underwater telemetry including the steps of receiving acoustic signals transmitted from a single source underwater in a plurality of frequency channels along a plurality of paths leading to a plurality of spatially diverse hydrophones, determining an estimate of the reliability of the signals received along each of the paths, and combining the signals received along each of the paths in accordance with the estimate of reliability associated therewith to recover a replica of the signals transmitted by the source.

The spatial diversity receiver of the present invention performs reliably in a variety of non-Gaussian noise and jamming environments and operates a traditional optimal diversity system in a Gaussian environment. The dynamics of the quality estimator allow operation in the presence of high-power impulsive interference by exploiting the signal and noise differential travel times to individual sensors.

DETAILED DESCRIPTION OF PREFERRED EMBODIMENT(S)

The spatial diversity system of the present invention provides a means of increasing reliability without the throughput and bandwidth cost of a very low-rate error correction scheme and provides substantial advantages during extremal channel conditions when conventional error control codes are overwhelmed and channel equalizers are unable to track the multipath fluctuations.

An acoustic telemetry link is usually only one part of what may be a very complex and expensive underwater system. The cost of a link failure must be taken into account when such a system is designed, and anything the designer can do to reduce the possibility that the link will become inoperable must be considered. Solutions which appear excessively complex or computationally intensive in other communication applications are frequently justified in underwater acoustic communication. The spatial diversity system of the present invention maintains a quality check on hydrophone performance and can switch from faulty or jammed units to new ones automatically. This allows the system operator to select, change, and redistribute receiver hydrophones without interrupting the system. Since hydrophone failures are one of the most likely system failure modes, an automatic monitoring system is of practical value. The present invention provides techniques for selecting and weighting the output from multiple hydrophones for optimal operation under both excellent and worst-case conditions.

Advantages of diversity reception over fluctuating channels are well documented in the literature, for example, in J. M. Wozencraft and I. M. Jacobs, *Principles of Communication Engineering*, New York: Wiley, 1965, and R. Kennedy, *Fading Dispersive Communication Channels*, New York: Wiley, 1969. Most conventional techniques use explicit diversity, where a number of diversity paths are deliberately excited by the transmitter, and the available power is divided among the diverse paths. The ocean acoustic channel supports a number of independently propagating transmission paths, and it is rather difficult to avoid exciting several diversity paths with realistic acoustic communication systems, as shown in S. M. Flatte, ED., *Sound Transmission Through a Fluctuating Ocean*, Cambridge, UK: Cambridge Univ. Press, 1979. The number of paths is roughly independent of transmitter power, and system performance improves monotonically with the number of received paths, as discussed in Kennedy, *Fading Dispersive Communication Channels*, op cit, and R. Price and P. E. Green, Jr., "A Communication Technique For Multipath Channels", Proc. IRE, Vol. 46, pp. 555–570, March 1958. In accordance with the present invention, implicit diversity is achieved through time diversity by a spatial diversity receiver optimized for the non-Gaussian interference environment of a typical location, such as a shallow-water marine channel or an offshore worksite.

The ocean channel supports several forms of implicit diversity transmission. The channel multipath results in a number of distinct eigenrays, or independently propagating rays, from the source to the receiver. Multipath separation and diversity processing of time-dispersed arrivals result in a performance improvement through the use of time diversity. Frequency coherence in the shallow-water ocean waveguide is generally less than 100 Hz at time scales of 10 Hz, the dominant turbulence-induced timescale as shown in Flatte, *Sound Transmission Through a Fluctuating Ocean*, op cit, and D. M. Farmer, S. F. Clifford, and J. A. Verall, "Scintillation Structure Of A Turbulent Tidal Flow", J. Geophys. Res., Vol. 92, pp. 5369–5382, 1987. Explicit frequency diversity is thus simple to obtain through multi-channel signaling, but implicit frequency diversity is not known to be exploited because of the high bandwidth expansion required, as shown in Kennedy, *Fading Dispersive Communication Channels*, op cit, and J. A. Catipovic, "Design and Performance Analysis of a Digital Acoustic Telemetry System", Sc.D. thesis, MIT, Cambridge, Mass., 1987. Spatial diversity is encountered in the deep ocean largely through micromultipath fluctuations encountered along a single ray, which cause signal scintillation with a spatial coherence extent $K(\Delta y)$ defined in terms of the phase structure function, such that $$K(\Delta y)=e^{-D(\Delta y)/2} \qquad (1)$$

where $D(\Delta y)$ is the phase structure function, as shown in Flatte, *Sound Transmission Through a Fluctuating Ocean*, op cit. The spatial coherence scale for the geometries and frequencies of interest is typically on the order of meters, as shown in Farmer, Clifford, and Verall, "Scintillation Structure Of A Turbulent Tidal Flow", *J. Geophys. Res.*, op cit.

The shallow-water environment is frequently fully saturated, fluctuation with a scintillation index in excess of unity. Initial findings indicate a spatial coherence length of less than 35 cm at 15 to 35 kHz for a 0.8 km propagation range in Woods Hole Harbor.

In addition to spatially dependent signal fluctuation, noise processes and signal reception problems combine to produce a rapidly time-variant non-Gaussian communication channel. The spatial extent of many noise generators, such as bubble plumes, and the spatial coherence of the received channel fluctuations are often on the order of several meters, which is exploited to achieve a reliability increase through receiver diversity processing in accordance with the present invention. The required hydrophone separation is on the same scale as the channel inhomogeneities.

Diversity reception is conventionally considered to be undesirable for use in non-fluctuating channels, because diversity combining conventionally introduces additional noise or combining loss into the demodulator statistics. However, when the noise is not additive Gaussian and is uncorrelated between sensors, a processing gain is achievable. In the underwater telemetry context, it is generally worthwhile to exploit implicit channel diversity even in a non-fluctuating environment. For an implementation such as a ship following a rapidly maneuvering ROV, noise mechanisms such as bubble clouds, impulsive hull noise, and wake turbulence degrade signal quality and may completely mask it. However, all of these are inherently local phenomena and well mitigated with the spatial diversity system of the present invention.

Non-Gaussian noise and interference processes include:

1) Bubbles The bubble distribution under a breaking wave and the resultant noise field, generated by bubble resonances, is described in D. M. Farmer and S. Vagle, "Waveguide Propagation Of Ambient Sound In The Ocean-Surface Bubble Layer", *J. Acoust. Soc. Amer.*, Vol. 87, No. 5, pp. 1897–1908, November 1989. The bubble plume dimensions are on the order of 10 m, and the plume generally remains in position for several seconds. During this time, a hydrophone within the plume may be assumed to be inoperative because of sound scattering and attenuation by the bubbles. A ship acts as a major source of bubble plumes, but the problem is quite specific to the motion and type of the vessel as well as the ambient sea state. It is best to assume, however, that any hydrophone near a hull will be occasionally subjected to bubble plumes.

2) Impulse Noise Impulsive noise caused by hull slamming, shipboard activities, or nearby events such as pile-driving, typically corrupt telemetry transmissions through sheer power, as discussed in A. B. Baggeroer, "Acoustic telemetry —an overview," *IEEE Journal of Oceanic Engineering*, Vol OE-9, pp. 229–235, October 1984. Fortunately, such events often propagate in a direction different from the desired waveform and interact with different data packets at various receivers. In the case of a Multiple Frequency Shift Keying or MFSK data packet containing 128 tones (i.e., 128 data bits), that is 10 ms in duration, and an impulsive event of similar length, the spatial extent of each event is then on the order of 15 m. If two hydrophones are spaced such that the difference of differential travel times for the noise event and data is greater than 20 ms, the two receivers record the noise waveform interacting with different data packets. The receiver may then identify each bad data packet and weigh the received information properly. If three hydrophones can be placed such that they form an approximate equilateral triangle, operation in the presence of out-of-plane noise sources improves.

3) Turbulence Wake turbulence and the entrained bubble stream can be severe problems if a recently generated wake is between the source and shipborne receiver, as might occur when the tracking ship suddenly backs down, turns sharply, or gets ahead of the vehicle. At this time, most of the forward-looking transducers become inoperative. The spatial diversity system of the present invention can either employ a set of transducers dedicated to such events, for instance by towing a deep transducer platform, or a sonobuoy can be deployed when operations require complex maneuvering. The sonobuoy receiver can be interfaced to the data processor at all times, and the system will begin using the new receiver when the data quality is sufficiently high. This allows precautionary measures to be taken during critical operations and also allows the ship to leave station for short intervals.

The spatial diversity processor of the present invention is capable of spatially discriminating transmitted signals from out-of-plane impulsive noise and jammers. Independent frame synchronization at each receiver element produces a relative propagation delay vector for the signal. The received signal can be modeled as $$r(t) = \sum_{k=1}^{L} x_k(t - \beta_k T) + n_k(t - \beta_k T) \quad (2)$$

where $x_k(t-b_k T)$ is the desired portion of the signal received at the kth element at time $(t-b_k T)$, $n_k$ is the noise component, and $b_k$ is the relative delay vector estimated from the frame synchronizer. The noise vector component arising from out-of-plane directional sources arrives at the receiver with a differential travel time $\alpha$. For an impulsive noise source, the received noise vector is $$n(t) = \sum_{k=1}^{L} n_k(t - \alpha_k T) + n_{AWGN}(t) \simeq \sum_{k=1}^{L} n_k(t - \alpha_k T) \quad (3)$$

where $\alpha$ is the differential delay vector for the noise and $N_{AWGN}(t)$ is additive white Gaussian noise. For a loud broadband jammer such as a pile drivel, a single arrival is sufficient to overwhelm the entire received signal, in which case:

$$n_k(t - \alpha_k T) > \sum_{k=1}^{L} x_k(t - \beta_k T). \quad (3.1)$$

The received signal is then:

$$r(t) \simeq \sum_{k=1}^{L} x_k(t - \beta_k T) + n_k(t - \alpha_k T). \quad (4)$$

A single noise arrival is assumed to be sufficient to corrupt the output of the diversity processor. The discriminating capability is directly related to the modulation format, particularly to the frame duration time. In a presently preferred embodiment, 128 FSK modulation and 12.8 -ms frame lengths are used. The differential travel times $|\alpha_k - \beta_k| > 12.8$ ms are required to separate the arrivals. A shorter frame length decreases this requirement, but at a cost of increased multipath sensitivity as shown in Catipovic, "Design and Performance Analysis of a Digital Acoustic Telemetry System", op cit. The 128 FSK transmissions in a single data frame facilitate estimation and classification of frames jammed by an impulsive broadband source. The required hydrophone separations are typically obtainable when the receivers are mounted shipboard or on offshore structures.

In order to most appropriately use the multiple received signals available in a diversity system, the signals must be effectively combined. There are three basic methods for performing this combining: (i) Sum the receiver output; (ii) select the channel with the most energy or largest SNR; and (iii) use a weighting factor based on individual channel reliabilities to combine the signals.

The first method, summing the channels, is the simplest conventional technique to implement, but is not desirable when the presence of a large amount of noise on one channel is possible. A system configured in this manner may operate well under certain conditions (the classic Rayleigh channel without extremal events), but becomes more sensitive to failure as more receivers are added because of the likelihood that one will become masked, damaged, or simply fail. These methods, summing, selection, and weighted combining, are discussed below in greater detail. In the Rayleigh channel, the performance degradation of the maximal output processor and optimal weighted combiner is small, as shown in G. T. Chyi, J. G. Proakis, and C. M. Keller, "On the symbol error probability of maximum selection diversity reception schemes over a Rayleigh fading channel", *IEEE Transactions on Communications*, Vol. 37, pp. 79–83, January 1989, but both maximum output and the simple summed combiner methods degrade significantly in the presence of non-Gaussian noise and interference structures commonly found in the ocean acoustic channel.

The diversity receiver of the present invention, however, processes several independently corrupted replicas of the transmitted signal to obtain an optimal estimate of the transmitted data by combining weighted estimates of the incoming data sequences. For L diversity receivers, each with independently fading signal replicas, the received signal is given by:

$$r_k(t) = \alpha_k e^{-j\phi_k} s_{km}(t) + n_k(t) \quad (5)$$

where $\alpha_k e^{-j\phi_k}$ represents the complex gain seen at the kth receiver, $s_{km}$ is the mth symbol sent over the kth channel, and $n_k(t)$ is additive white Gaussian noise (AWGN) with variance $N_k/2$. Assume M-ary orthogonal signaling such that $s_{k,i=1}$ and $s_{m=2} \ldots M, k=0$. The ML optimal diversity receiver sums weighted signal replicas as shown in Wozencraft and Jacobs, *Principles of Communication Engineering*, op cit:

$$R_1 = \sum_{k=1}^{L} |2\alpha_k e^{-j\phi_k} + n_{k1}|^2 \quad (6)$$

$$R_{j=2\ldots M} = \sum_{k=1}^{L} |n_{kj}|^2. \quad (7)$$

Assuming constant average SNR per path $\gamma_k$, the symbol error probability is $$P(\epsilon) = \frac{1}{(L-1)!} \sum_{m=1}^{M-1} \frac{(-1)^{m+1} \binom{M-1}{m}}{(1+m+m\gamma_k)^L} \sum_{K=0}^{m(L-1)} \beta_{km}(L-1+k)! \left( \frac{1+\gamma_k}{1+m+m\gamma_k} \right)^k. \quad (8)$$

When average path strengths are not equal, the receiver weighs each path contribution by the mean path SNR before summing, as shown in L. Izzo and L. Paura, "Asymptotically optimum space-diversity detection in non-Gaussian noise," *IEEE Transactions on Communications*, Vol. COM-34, pp. 97–103, February 1986. Taking this approach to its logical extreme would result in the often-used maximum-output diversity receiver, where only the path with the highest instantaneous SNR or maximum output at the demodulator is used. The maximum output -or MO- receiver error probability is given by and shown in Chyi, Proakis, and Keller, "On the symbol error probability of maximum selection diversity reception schemes over a Rayleigh fading channel", *IEEE Transactions on Communications*, op cit, as follows:

$$P(\epsilon) = \sum_{j=0}^{L} (-1)^j \binom{L}{j} \prod_{k=1}^{L(M-1)} \left( \frac{k}{k+j/(1+\gamma_k)} \right). \quad (9)$$

The MO receiver degradation from optimal, as shown in equation (8), is approximately 2 dB at $P(\epsilon)=10^{-5}$ and $L=4$ as shown in Chyi, Proakis, and Keller, "On the symbol error probability of maximum selection diversity reception schemes over a Rayleigh fading channel", *IEEE Transactions on Communications*, op cit.

In practice, the path arrivals do not have equal energy and the receiver must therefore determine the number and the path SNR of the arrivals to be used. The unequal energy assumption becomes particularly important on non-stationary noise and in non-Gaussian channels, where it is important to jointly estimate channel characteristics and certain signal parameters as discussed in Izzo and Paura, "Asymptotically Optimum Space-Diversity Detection in a Non-Gaussian Noise", *IEEE Transactions on Communications*, op cit. The ocean acoustic channel is particularly prone to non-stationary behavior, with parameters such as wave slop, bubble clouds and spatially dependent transmission loss, dominating the signal quality of near-surface receivers.

In a channel corrupted by a bubble cloud generated by a breaking wave, the transmitted signal is attenuated—and the ambient noise level is increased by as much as 30 dB—in the frequency band of interest. The path becomes unusable, but the conventional maximum output criterion would likely select it because of the instantaneous noise level. Similarly, conventional SNR estimators behave poorly in the presence of non-stationary and impulsive noise fields as discussed in J. K. Holmes, *Coherent Spread Spectrum Systems*, New York: Wiley, 1982. At any given time, one or more of the receivers on a tracking ship may be inoperable because of ambient noise or signal shading. Conventional straightforward summing of all hydrophone inputs leads to poor performance because of the noise levels present at some receivers.

The difficulties of monitoring channel quality in realistic oceanic media are overcome with the present invention by using a reliability measure based on channel error probability, rather than on SNR measurements or the received energy level. This approach was developed for the optimal time diversity combining of data packets by D. Chase as shown in, "Code combining—a maximum likelihood decoding approach for combining an arbitrary number of noisy packets", *IEEE Transactions on Communications*, Vol. COM-33, pp. 385–393, May 1985. As used herein, the Maximum-Likelihood -or ML- error criterion yields a diversity receiver formulation expressed directly in terms of the channel error probability, without requiring models of channel fluctuation behavior as shown by Chase, above. The ML decoder of the present invention maximizes the conditional probability between the received signal r(t) and transmitted sequence $x_n(t)$, as follows:

$$\max_n \left\{ p[r(t)|x_n(t)] = \prod_{i=1}^{L} (1-p_i)^{N-d_{ni}} p_i^{d_{ni}} \right\} \quad (10)$$

where $d_{mi}$ is a distance measure between $x_n(t)$ and r(t) along the ith diversity path:

$$\max_n \{\ln[p(r(t)|x_n(t))]\}$$

$$= \max_n \left[ \sum_{i=1}^{L} N \ln(1-p_i) - d_{ni} \ln\left( \frac{1-p_i}{p_i} \right) \right] \quad (11)$$

$$\sim \min_m \left[ \sum_{i=1}^{L} d_{ni} \ln\left( \frac{1-p_i}{p_i} \right) \right]. \quad (12)$$

The above equation is a weighted distance measure between the received and transmitted waveforms for the ith packet, with the weighting derived from the channel error probability shown in Chase, above, as follows:

$$\min \left\{ \sum_{i=1}^{L} \ln\left( \frac{1-p_i}{p_i} \right) \sum_{j=1}^{} Nr(t) \oplus x_n(t) \right\} \quad (13)$$

where the $\oplus$ refers to a soft-decoding distance measure between the received and transmitted signals. The ith received data packet is weighted by $$w_i = \ln\left( \frac{1-p_i}{p_i} \right). \quad (14)$$

The error probability estimator is dependent on the details of modulation and coding methods and is described below in greater detail.

Explicit diversity transmission would not be beneficial in a non-fading AWGN environment and actually degrades performance compared to a single-diversity system, simply because power is being spread along several noisy channels and additional noise power is present at the receiver as shown in Wozencraft and Jacobs, *Principles of Communication Engineering*, op cit. However, spatial diversity in accordance with the present invention exploits the implicit diversity present in the underwater acoustic channel to achieve a performance increase.

The performance gain may be described by considering the spatial diversity receiver as a sensor array operating in the presence of signal amplitude and phase distortion and AWGN. SNR at the array output is termed the array gain, $G(w)$ as shown in H. Cox, "Sensitivity considerations in adaptive beamforming", in *Proc. NATO Advanced Study Instit. Signal Process*, Loughborough, UK, August 1972, pp. 619–643 as follows:

$$G(w) \equiv \frac{k^*(w)P(w)k(w)}{k^*(w)Q(w)k(w)} \quad (15)$$

where

P(w) signal cross-spectral density matrix,

Q(w) noise: cross-spectral density matrix, k(w) steering weight vector for a coherently received plane wave, $P(w)=m(w)m^*(w)$; i.e., a simple dyad where m(w) is an N element signal-delay vector. In this case, $G(W) 23 N$, with equality achieved, if $$k^*(w)=m^*(w)Q^{-1}(w) \quad (20)$$

and $Q(w)=I$.

As the signal decorrelates across the array aperture, the quadratic array processor becomes optimal. The array gain is given by and shown in Cox, above.

$$G(w) = \frac{\text{trace}[K^+(w)P(w)k(w)]}{\text{trace}[K^+(w)Q(w)k(w)]} \leq \{\text{trace } [P(w)Q^{-1}]^2\}^{1/2} \quad (17)$$

where $K(w)$ is defined in FIG. 1, $M(w)$ is the steering vector matrix, and $P(w)=M+(w)M(w)$. For a fully incoherent signal, Spatial diversity processing of mutually incoherent arrivals may then be usefully viewed as a quadratic beamformer attempting to maximize the array gain at the output. The steering vector requirements reduce to independent frame synchronizer outputs at each channel, since the steering vector merely identifies the relative frame packet delays. A resolution error which is small compared to the packet length, on the order of $\cong 10$ ms, is acceptable.

The above derivation is strictly applicable only in additive Gaussian noise, and the array gain maximized only in white noise. However, the result is easily extended to a partially jammed channel where a number of receiver elements may be inoperative due to impulsive noise, bubble radiation, or signal masking. The jamming receivers are easily identifiable by their excessive error rate and removed from further processing; the array gain is computed from the leftover elements.

The optimum combiner using weights based on error probability requires an accurate estimate of the error rate on all M FSK signals and for each new frame. The error probability estimator shown in FIG. 1 must be updated at each new data frame so that a serious error event seen by a particular receiver is detected before it can effect the entire data stream. In addition, it is important that bandwidth not be wasted by transmitting known sequences to estimate error probability. Thus the error estimator must work directly on the random data sequence and produce two new error probability estimates, $\hat{P}e(k)_{frame}$ for the kth frame and $\hat{P}e(k)$ for the jth FSK signal (a set of m FFT bins for m-ary FSK) within the kth frame.

It is important to estimate all of the M FSK error probabilities, $\hat{P}e(k)$, if a large number of errors are present in certain frequency bands, and none in others. The individual behavior for all M of the FSK signals at each receiver must be independently tracked to provide reliability in the presence of heavy interference.

The frame weight $w_{k(frame)}$ derived from the frame error probability $\hat{P}e(k)_{frame}$ gives an estimate of the reliability of a single MFSK tone group. Using a weight which is computed over such a short time interval provides quick identification of impulsive acoustic events or any sudden transition from good data to unusable data, that is, data with an error probability greater than 50%.

To determine the error probability at each receiver in accordance with the present invention, an estimate of the transmitted data sequence is obtained from the error-correction algorithm, then re-encoded and compared with the raw received data. These binary data blocks correspond to specific time-frequency cells in an MFSK system, and by noting the differences between the raw data and recoded data, the error probability is computed. An error probability estimator system 10, using the Viterbi algorithm for error correction, is shown in FIG. 1 together with an analog front end.

Figure 3:
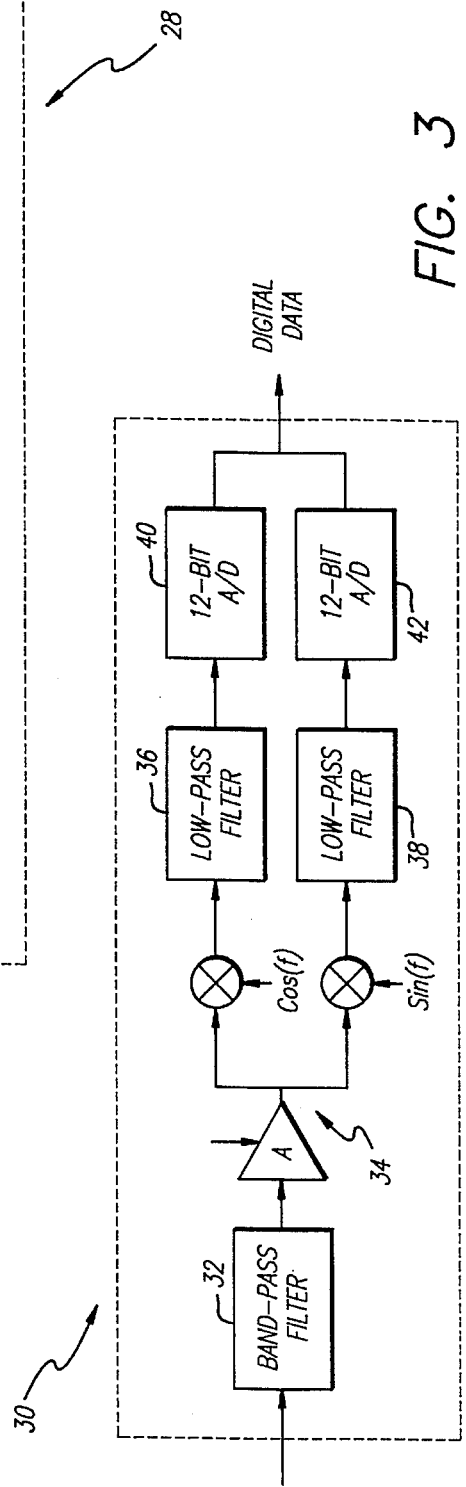
FIG. 3 is a block diagram of a programmable analog front-end used to receive and condition acoustic signals according to the present invention.
Figure 4:
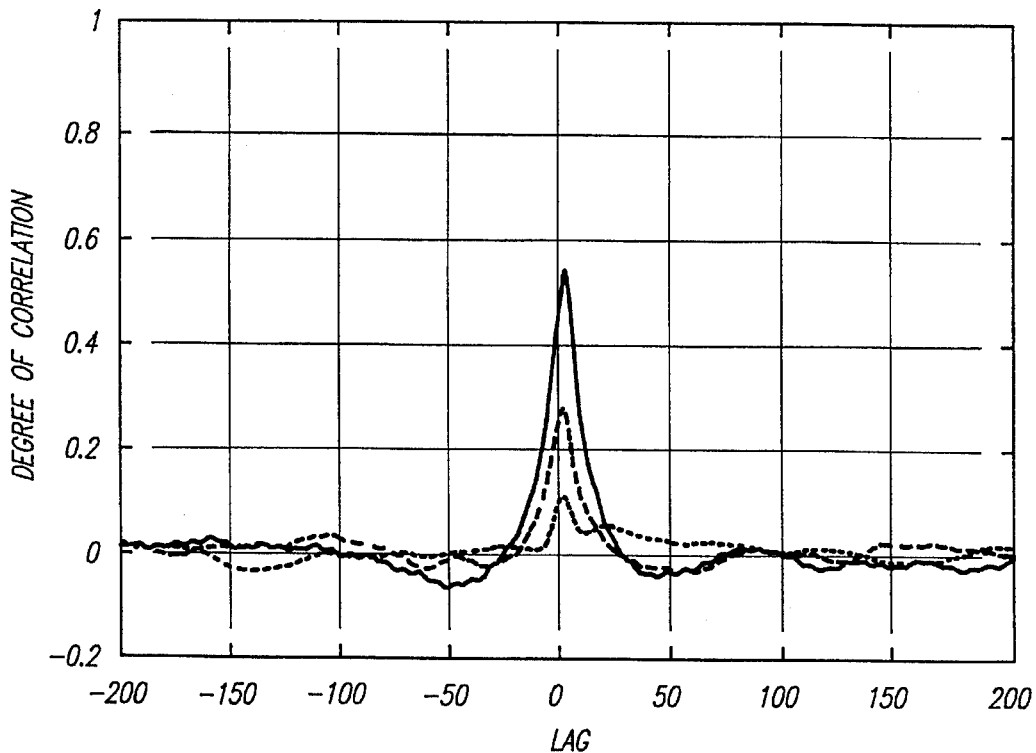
FIG. 4 is a graph of the cross correlation between receivers spaced at 3.5, 13 and 35 cm.

As described below in greater detail with reference to FIG. 3, the acoustic data at each receiver is bandpass filtered, quadrature demodulated, anti-alias filtered, and digitized as shown in J. A. Catipovic and L. Freitag, "WHOI Acoustic Telemetry Project Interim Report," WHOI, Woods Hole, MA, Tech. Rep. WHOI-89-21, July 1989. The resultant n-element, complex data vector corresponding to the kth frame is given by $$Y_k = Y_i, Y_i+1 \ldots Y_i n-1.$$

Figure 2:
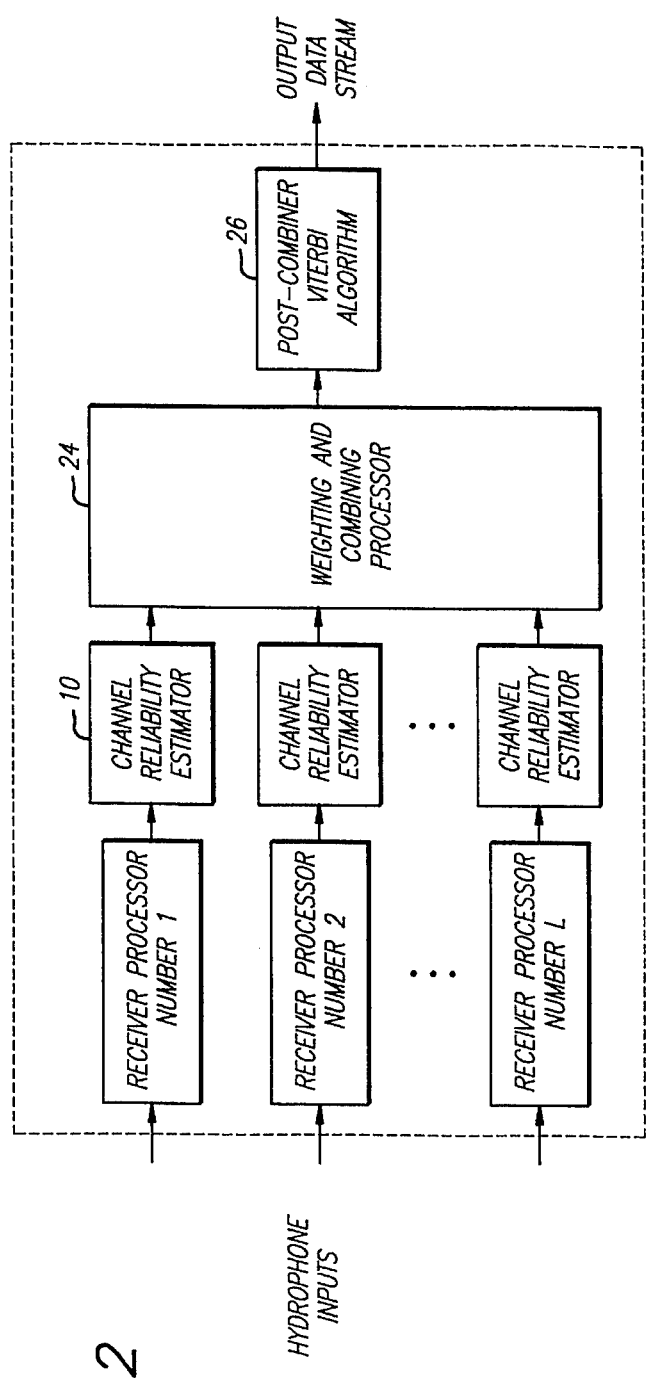
FIG. 2 is a block diagram of a spatial diversity telemetry receiver according to the present invention.

Referring now to FIGS. 1 and 2, this data frame is applied to error probability estimator system 10 and then Fourier transformed, $Y_k=F(y_k)$, in FFT 12 and soft-decision Viterbi decoded in Soft Decision Viterbi Algorithm (VA) decoder 14. The output of the VA decoder 14 is the decoded bit sequence $\alpha_k$ for that frame. Note that the bits corresponding to a given frame are not available until the paths through the decoder trellis merge; in practice this assumed to be true after a number of bits corresponding to about 5 times the constraint length have been decoded as shown in G. C. Clark, Jr. and J. Bibb Cain, *Error-Correction Coding for Digital Communications*, New York: Plenum, 1981. The output of the VA decoder 14 is then a vector of information bits $\alpha_k$ that has MR elements, where M is the number of raw bits transmitted per frame and R is the code rate. The output of the Soft Decision Viterbi Algorithm (VA) decoder 14, $\alpha_k=V(Y)$, is re-encoded in convolutional encoder 16, with the transmitter's convolutional code polynomials, $$a_k \xrightarrow{C(p)} b_k^{recoded}.$$

The vector $b_k^{recoded}$ output of convolutional encoder 16 is an estimate of the raw binary block actually transmitted. The actual raw binary block is the output of FFT 12 $Y_k$ transformed into the bit sequence $b_k^{raw}$ in Raw Bit Decoder 18 as if it were uncoded. Then the error vector for the block is $$\hat{e}_k = b_k^{raw} \oplus b_k^{recoded},$$

where $\oplus$ is the exclusive-or operation and is provided by Error Vector Generator 20. An element $\hat{e}_{kj}$ of $\hat{e}_k$ is thus either zero or one. A one at element j corresponds to an assumed error at that FSK time-frequency cell. The estimated error probability, provided by Error Probability Estimator 22 at the kth frame for the jth FSK signal, is then:

$$\hat{P}e_j(k) = \frac{1}{n} \sum_{i=1}^{n} \hat{e}_{j(k-i)},$$

where n is the number of frames used to estimate ^Pe_j(k). The estimator interval n depends on the anticipated rate of change of the channel, and it should be small for rapidly varying channels (moving source-receiver) and may be much longer (computed over several seconds) for moderately time-variant channels.

In addition to the individual error probabilities computed at each new frame, the memory-less estimate of an entire frame's error probability is $$\hat{P}e(k)_{frame} = \frac{1}{M} \sum_{i=1}^{m} \hat{e}_{ki}.$$

The frame and the FSK bin error probabilities are then used to compute weights using the equation developed above:

$$w = \ln\left(\frac{1-p_i}{p_i}\right).$$

Thus the kth frame weight $$w_{k(frame)} = \ln\left(\frac{1 - \hat{P}e(k)_{frame}}{\hat{P}e(k)_{frame}}\right)$$

and the individual weights are $$w_{jk} = \ln\left(\frac{1 - \hat{P}e_j(k)}{\hat{P}e_j(k)}\right).$$

Referring now more specifically to FIG. 2, a block diagram of spatial diversity telemetry receiver system 28 is shown. So that the actual weighting operation performed in weighting processor 24 can be written in vector notation, the vector $w_k$ is formed from the $w_{jk}$ such that elements Mj --- Mj+M of $w_k$ are equal to $w_{jk}$. Then, $$Y'_k = W_{k(frame)}(W_k Y_k).$$

Expanding the subscripts to include an index for the receiver number yields the weighted block from the lth receiver $Y'_{kl}$ where l=1 ... L for an L receiver system The weighted, combined demodulator block is $$X_k = \sum_{i=1}^{L} Y_{ki}.$$

The Viterbi algorithm is then invoked in Post-Combiner Viterbi Algorithm Decoder 26 to give the final output data bit sequence:

$$a'_k = V(X_k).$$

In order to experimentally determine the effectiveness of the methods outlined above, a number of different data sets were collected using a short horizontal test range. The transmitted waveform was a CW replica of a 1-of-2 MFSK signal spanning 20 kHz, with M equal to 128. The tone spacing ΔF is determined by $$\Delta F = \frac{BW}{2*M}$$

where BW is the signal spectrum bandwidth. The tone interval also determines the minimum frame length, $$Tf = \frac{1}{\Delta F}$$

The data rate is then $M/T_f$, which with $T_f$=12.8 ms and M=128 yields 10 000 b/s.

For these experiments, because both source and receiver were stationary, no Doppler shift was present and a close tone spacing was used to minimize bandwidth and maximize throughput. However, when relative velocities of more than a few knots are expected, the tone spacing must be increased or the frequency shift must be tracked and compensated for. Means for Doppler compensation are discussed briefly in L. E. Freitag and J. A. Catipovic, "A Signal Processing System for Underwater Acoustic ROV Communication", Proceedings of the 6th International Symposium on Unmanned Untethered Submerible Technology, pp. 34–41, Baltimore, Md., June 1989.

The signal was generated at baseband and modulated to the 15 to 35 kHz band before transmitting through an amplifier-transducer combination which provides approximately 2 W of acoustic power into the water. The all-zero data sequence was transmitted so that the information could be easily evaluated as coded or uncoded. All of the data presented here were gathered in Woods Hole harbor over a 700-m horizontal path in water that ranges from 7 to 20-m deep.

To collect the data two identical omnidirectional hydrophones, programmable analog processing systems, and digitizers were used as shown in Catipovic and Freitag, "Spatial Diversity Processing For Underwater Acoustic Telemetry", *IEEE Journal of Oceanic Engineering*, op cit. A block diagram of the analog front-end 30 is shown in FIG. 3. The band-pass filter 32 was programmed with cut-off frequencies of 15 and 35 kHz, and the quadrature demodulator 34 was programmed to demodulate the signal to baseband. The signal was then low-pass filtered in low pass filters 36 and 38, sampled at the 40 kHz complex in digital to analog to digital converters 40 and 42, then stored for further processing. The data blocks collected are short snapshots of the acoustic channel, each 6.4-s long and representing 64,000 bits of uncoded data.

Two main advantages of using a wide-band MFSK waveform for underwater acoustic telemetry in a presently preferred embodiment are immunity to interference due to narrowband noise and reduced sensitivity to deep fades at specific frequencies. While the energy per tone of an MFSK signal decreases as M is increased (for a fixed transmitted power level), reliability is enhanced in the fading channel because the likelihood of a large number of simultaneous fades is very small.

The reliability of different FSK signals transmitted in parallel varies greatly. Even with interference, such as an approaching outboard motor, there are still regions in the signal band which allow error-free communication. The existence of these low error-rate bands, coupled with the fact that they tend to be received by different receivers, makes the spatial diversity system of the present invention effective even in heavy noise fields.

Spatial diversity as embodied in the present invention provides a large reduction in the raw error probability, which allows the decoder to correct all errors when that would not otherwise be possible.

The level of signal similarity seen at two receivers, $R_a$, and $R_b$, is related to the difference in the channel-transfer functions between the transmitter and each receiver. These transfer functions $H_a(t)$ and $H_b(t)$ can be represented by some function H(t,s), where s indicates spatial position.

Given that the received signals at the receivers are $y_a(t,s_a)$ and $y_b(t,s_b)$, the distance $\Delta s = s_1 - s_b$, where the signal cross-correlation functions resulting from $y_a(t,s_a)$ and $y_b(t,s_b)$ reach a specified level, is related to the actual spatial coherence.

When an interfering noise source $n(t)$ is present, the geometry and resulting propagation paths from the data transmitter and noise source to the receivers determines the coherence level of received signal. The signal at receiver $R_a$ is $$Y_a(t,s_a) = s(t) * H_s(t,s_a) + n(t) * H_n(t,s_a)$$

where $H_s(t,s_a)$ is the transfer function from the transmitter to receiver A, and $H_n(t,s_a)$ is the transfer function affecting the noise signal propagating from the noise source to receiver A. Similarly, at $R_b$:

$$Y_b(t,s_b) = s(t) * H_s(t,s_b) + n(t) * H_n(t,s_b).$$

Particularly in shallow water where localized turbulence and micro-multipath are present, the signals $Y_a(t,s_a)$ and $Yb(t,sb)$ in the presence of noise arriving from a different direction are very dissimilar. Not only is the signal from the source to $R_a$ different from the signal at $R_b$, the two signals are corrupted by different noise fields resulting from the noise's interaction with different channel transfer functions.

Combining the information from the two receivers greatly reduces the error rate, particularly when the combining is done with optimal weighting.

The key to optimal use of multiple, spatially distributed receivers is the identification of the reliability of each time-frequency cell. As was described above, frame weight $w_{k(frame)}$ and the MFSK bin weights $w_k$ may be computed from the error estimate: $\hat{e}_k$ to yield a reliability measure for each time-frequency cell.

The error-probability estimator 10 is shown in FIG. 1. Data from the FFT demodulator 12 is decoded using a soft-decision Viterbi algorithm, in VA decoder 14, described in Clark and Cain, *Error-Correction Coding for Digital Communications*, op cit, and in J. G. Proakis, *Digital Communications*, New York: McGraw-Hill, 1983, and then recoded with a convolutional code in convolutional encoder 16 as described above. This estimate of the raw transmitted bit sequence is compared with the actual received bit sequence, and the difference taken as the error estimate $\hat{e}_k$. If all errors are corrected, the recoded data is exactly what was transmitted and the error estimate is obviously exact.

Figure 6A:
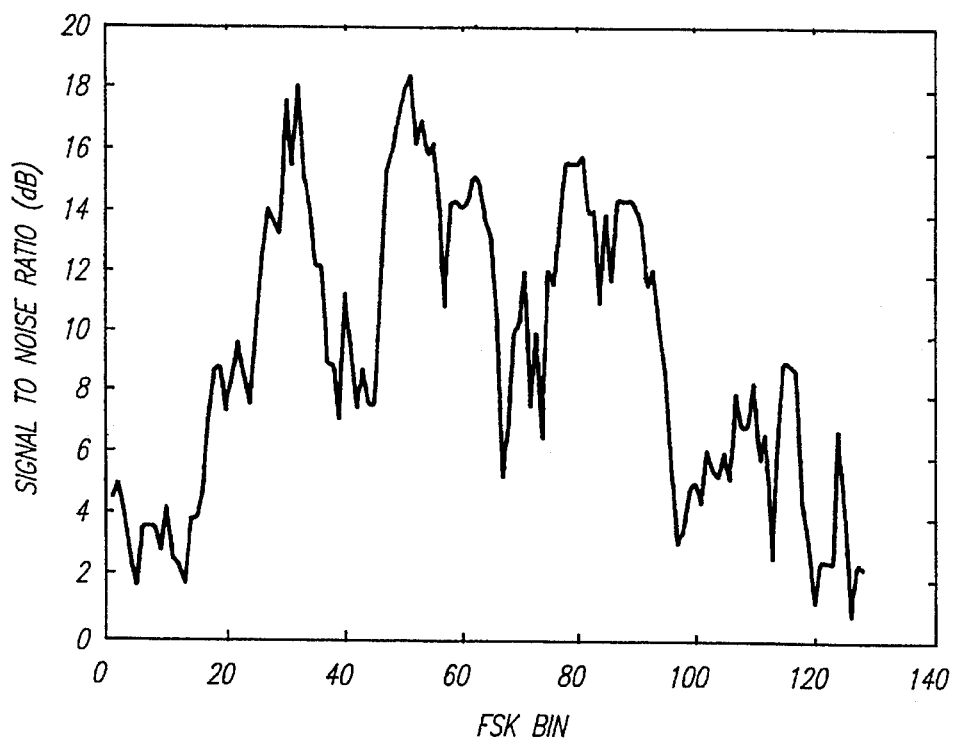
FIG. 6A and FIG. 6B are graphs of signal to noise ratio plots for the 128 FSK signals received at two receivers spaced 20 m apart with a nearby noise source.
Figure 6B:
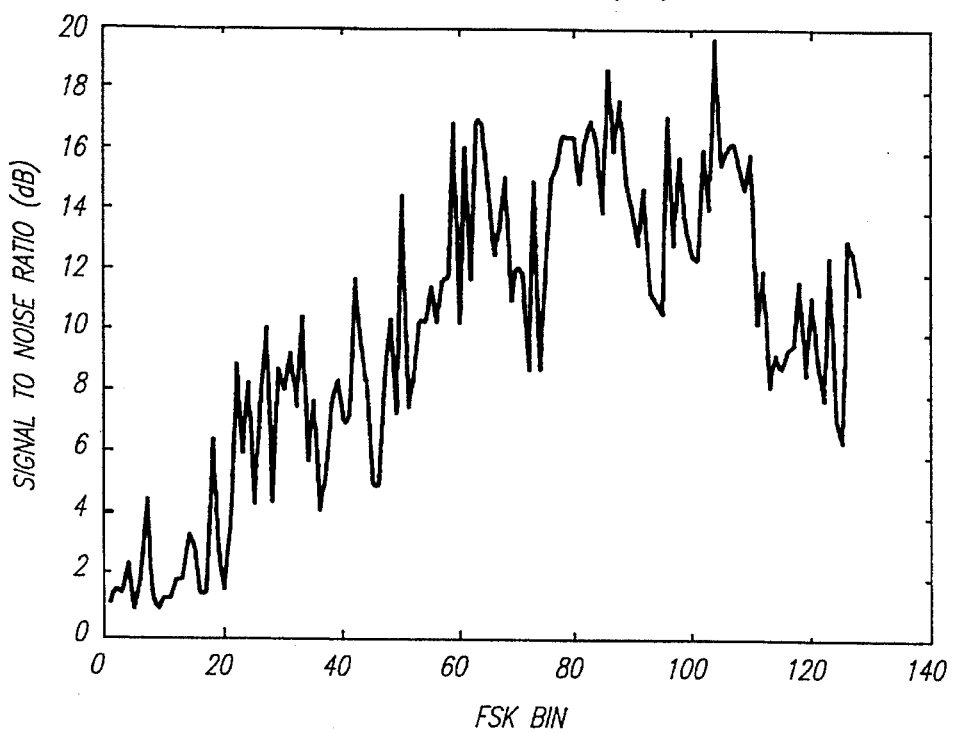
Figure 7A:
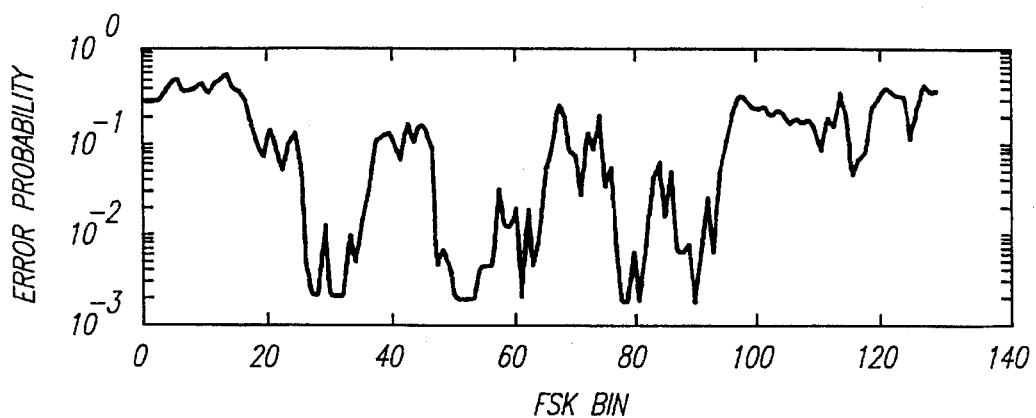
FIG. 7A and FIG. 7B are graphs of the actual error and estimated probabilities for one channel of data received with a nearby noise source.
Figure 7B:
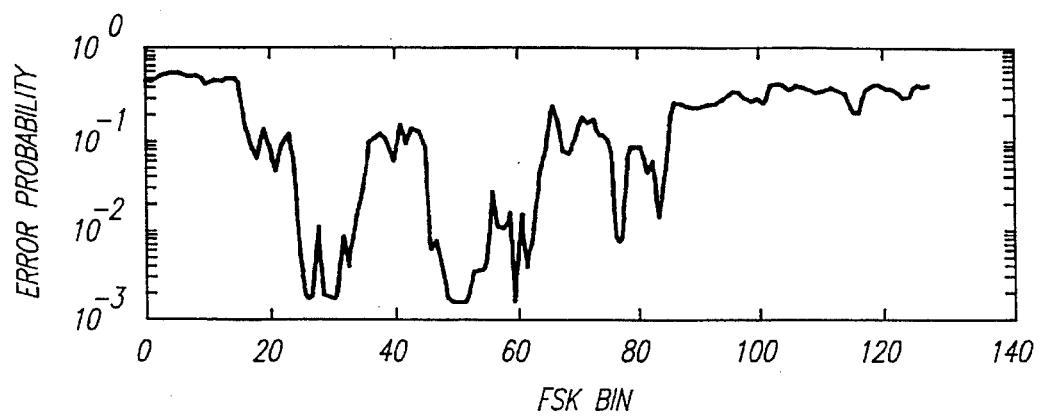

Of interest is the case where a convolutional code of a given complexity is not sufficient to correct all errors, and it is desired to use diversity to increase reliability. An example is the data collected from two hydrophones spaced 20-m apart while a motorboat was nearby (SNR plots for the two receivers are shown in FIG. 6). The error rate estimator was run on the data, and both the estimated and actual error probabilities for one channel are shown in FIG. 7. The two are very similar: where the Viterbi algorithm was able to always correct the received data the estimate is exact and the curves fall on top of one another; where the Viterbi Algorithm was unsuccessful, the error estimate is greater than the actual, although it still follows the trend indicated by the actual error-probability curve. The plots represent an average across 500 frames, and the estimate is quite accurate or overestimates the error rate but never represents the data as being better than it is.

Figure 8C:
FIG. 8A, FIG. 8B, and FIG. 8C are time-frequency error plots illustrating the summation and correction of data from two hydrophones under quiet conditions and 2 m separation.

A number of different data sets were combined and decoded using the weights as developed above. To allow the Viterbi algorithm to operate more effectively, an interleaver was used on each frame to reduce error clustering. Results of several different tests are shown in FIGS. 8–10. Three different cases are presented. In the first test the hydrophones were spaced 2-m apart and the area was acoustically quiet so that the data quality from both hydrophones was relatively good. In the second test one of the hydrophones was exposed to an idling ferryboat leading to poor data quality, while the other hydrophone (approximately 22-m away) was shielded by the dock allowing good data quality. In the third test both hydrophones (spaced 20-m apart) were exposed to a motorboat approaching at high speed and data quality from both hydrophones was relatively poor. These three data sets represent the range of conditions which an acoustic telemetry system may be exposed to under normal operating conditions.

Figure 8B:
Figure 8A:

In FIG. 8, time-frequency bit error plots are shown for quiet conditions and 2-m hydrophone separation. The raw bit error plots for both receivers show different error patterns, and the error plot for receiver A shown in FIG. 8a has about 1% errors, and the error plot for receiver B shown in FIG. 8b has about 1.8% errors. Both of these data sets were corrected to zero errors by the constraint length 5, rate one-half Viterbi error-correction algorithm. After weighting and combining, but before the second pass through the decoder, the error probability was $5 \times 10^{-4}$. As expected, the decoding of the combined data yielded no errors. Were conditions such as this expected all of the time, the error correction requirement would be greatly eased. When the error estimator needs an error-correction algorithm in order to determine the estimated error probability and thus the receiver's reliability, a much higher rate code could be used, resulting in a considerable savings in bandwidth.

But however good the acoustic channel may be some of the time, there will be times when, due to natural or man-made noise and interference that reliability is greatly reduced. It is especially under these circumstances that diversity is needed. An example of where the data from one hydrophone is very poor while the second hydrophone is still providing good quality data is shown in FIG. 9. Data from receiver A shown in FIG. 9a is good, with a raw rate of about 2.5%, which when interleaved and Viterbi decoded yields no errors. (Without interleaving, six errors remained after decoding.) Receiver B, however, has extremely poor quality data as shown in FIG. 9b, with an error rate of almost 17%. Even with interleaving and Viterbi decoding, the error rate is only reduced to about 14%. When the two are weighted, combined, and re-decoded, no errors remain. This demonstrates success for the system's ability to cope with extremely poor signal quality from one receiver.

The last situation presented here is that where both receivers (spaced 20-m apart) were providing fairly poor quality data due to the presence of an approaching motorboat. FIG. 10 shows the two raw bit error plots with 12 and 11% errors, respectively, from the receivers. However, we note that the structure of the raw error patterns is different between the two. Receiver A as shown in FIG. 10a shows two major bands of errors, one at the low end of the 128 FSK signal, the other wider and at the high end. In addition to these error bands, two lesser ones are visible in the center of the band. On receiver B shown in FIG. 10b, the error patterns are somewhat different. The error band at the low end is much wider than on receiver A, and the other error bands are not as severe as those seen at receiver A.

The output of the Viterbi algorithm for each receiver shows the effects of error clustering quite well. The center portion of the corrected error plot is now virtually error-free while edges which correspond to the error concentrations are no better than before decoding. The error probabilities at this point are now reduced to about 9 and 8%, respectively. The interleaver helps lower this by whitening the data that is passed to the Viterbi. After this is done the decoded error patterns show a significant improvement; however, still failing almost completely at the lower portion of the data set as input data quality continued to degrade.

FIG. 10(c) contains the weighted, combined, and re-decoded error plot, and it may be seen that while a few errors remain (20 out of 32,000 b), diversity combining has made a significant improvement to data quality and yields a final output error probability of $6.25 \times 10^{-4}$. Given the poor data seen at both receivers, the level of improvement embodied with the present invention is excellent.

These results are from fairly short data records and the effects of multipath and synchronization errors are not a major factor. However, the results demonstrate that the spatial diversity system of the present invention is an excellent way of maintaining underwater acoustic communications under difficult conditions.

The spatial diversity system for underwater acoustic telemetry of the present invention increases link reliability when limited bandwidth and power are available. When an acoustic link will have to function at the operational limits of practical error correction and equalization algorithms, spatial diversity provides an option that will not require increasing transmitted power, lowering throughput or sometimes shutting down the system.

Spatial diversity systems as shown in the Figures, used in the ocean acoustic environment, cannot utilize classic weighting techniques such as the maximum output (MO) criterion because of the high probability of noise events which would cause false weighting. A weighting technique originally developed in Chase, "Code Combining—A Maximum Likelihood Decoding Approach for Combining an Arbitrary Number of Noisy Packets", *IEEE Transactions on Communications*, op cit, is optimal in the maximum likelihood sense, and when used with MFSK signaling, the weights for both the individual FSK signals as well as for each frame in time are needed. An area of current research is the use of SNR weighting obtained from the metrics computed in the operation of the Viterbi algorithm. This should yield even better error-probability estimation and faster and more reliable adaptation.

A compact telemetry system embodiment of the present invention, for digital data acoustic telemetry at rates up to 10 kbits/sec over 1 to 10 km, is shown in FIGS. 2, 3, and 11 through 14, for moving remote operating vehicles or ROVs in a fading multipath shallow water environment. This embodiment is designed for worst case ocean acoustic channel conditions, and operates in the presence of source/receiver motion, fading and multipath. In addition, this system incorporates spatial diversity by utilizing multiple hydrophones and data processing subsystems. This allows much more reliable operation under realistic circumstances where noise events and transducer masking are unavoidable. The result is a system specifically geared toward use at sea with an ROV. Preliminary dockside test results demonstrate the effectiveness of the multichannel system of the present invention.

Acoustic telemetry from moving underwater vehicles is complicated by the continuously changing orientation between the source and receiver, the noise levels emanated by the vessels, and interfering mechanisms, such as bubble plumes and propeller wakes commonly found near moving ocean vehicles. Particularly when tracking a fast ROV, the following vessel undergoes a variety of maneuvers which may occasionally obscure or mask any receiving element.

Figure 11:
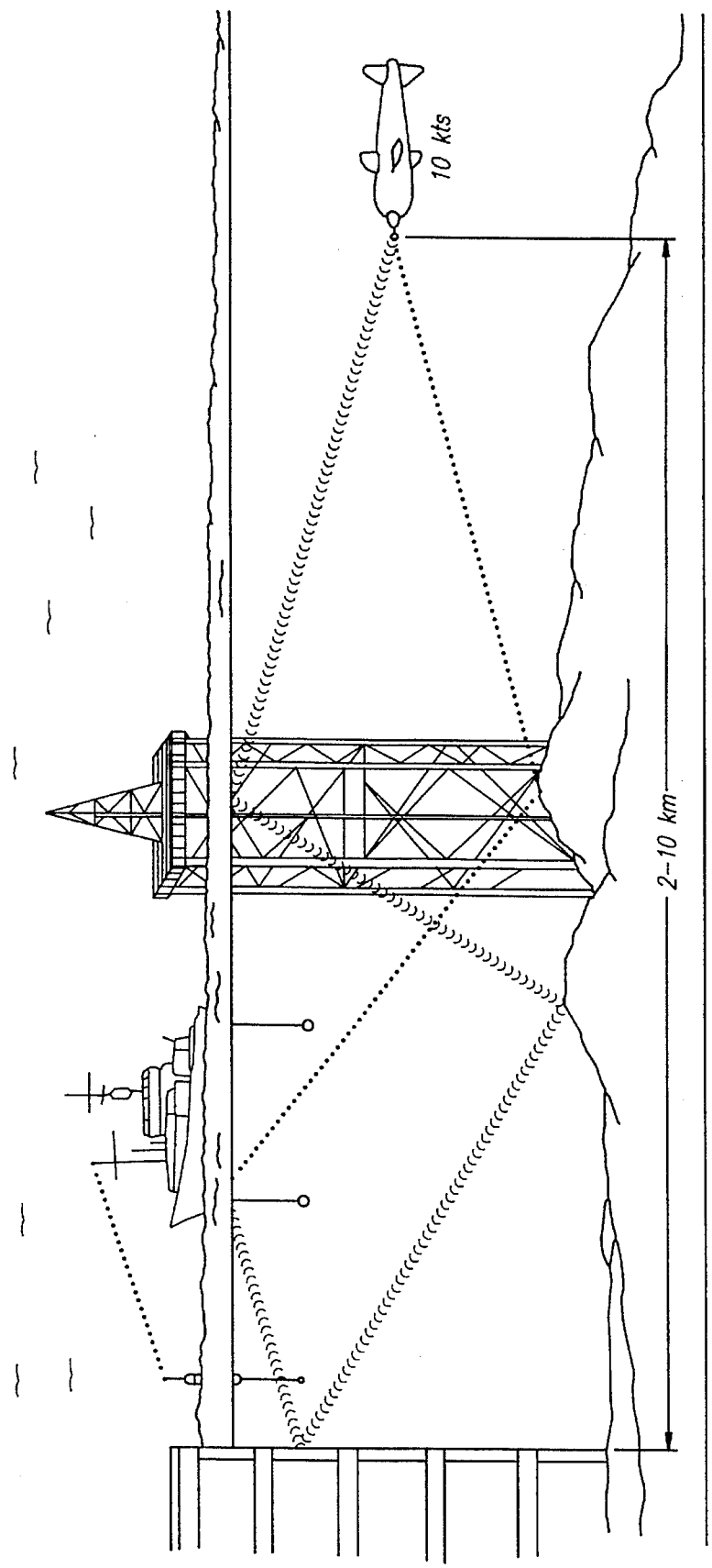
FIG. 11 is a pictorial view of a remote vehicle telemetry system with multiple receiver hydrophones.

An embodiment of the present invention includes an acoustic telemetry system operating from a number of receiving elements spatially distributed about the vessel, such as shown in FIG. 11. The receiving elements may be located in a bow dome or on the hull, on a towed platform or array, or perhaps even on a sonobuoy. The receiver must determine which of the available channels are operational at any given time, evaluate and monitor data quality, optimally combine individual arrivals into a robust data stream and maintain system operation even during times of severe channel fluctuations.

Figure 12:
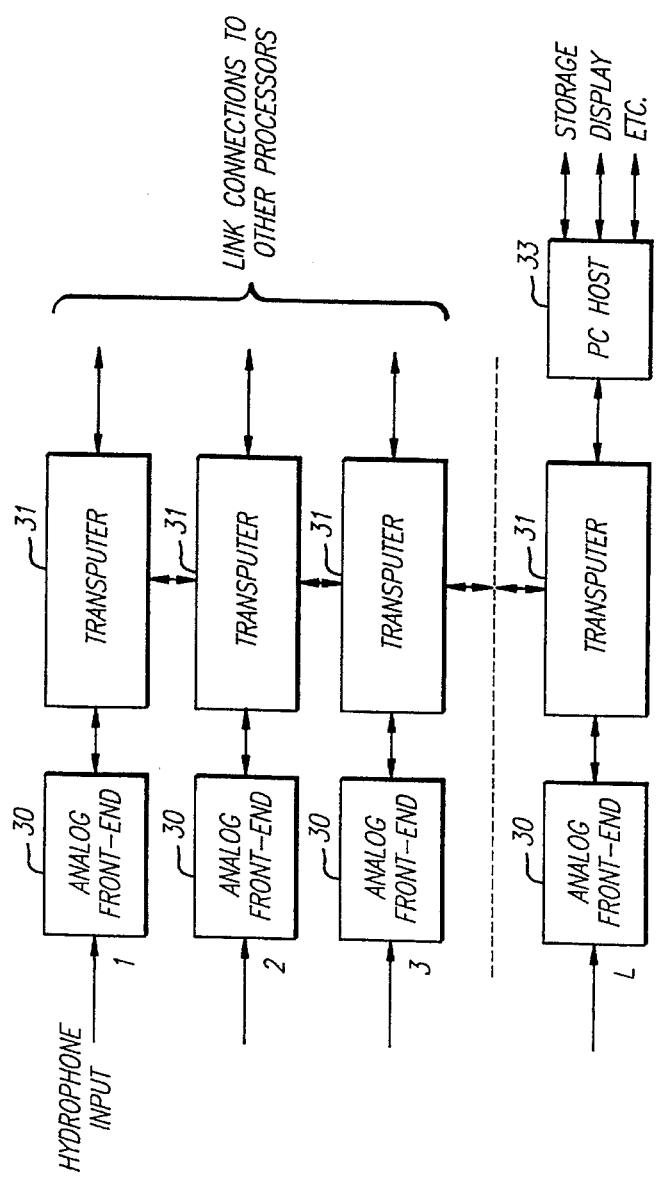
FIG. 12 is a block diagram of the telemetry system shown in FIG. 11.

Referring now to the block diagram shown in FIG. 12, the system hardware of the present invention will be described followed by a processing outline of a single receiver sub-system. The maximum likelihood (ML) optimal spatial diversity processor of the present invention, is then described, followed by detailed experimental results which demonstrate the effectiveness of the multichannel technique used in the present invention.

Figure 13:
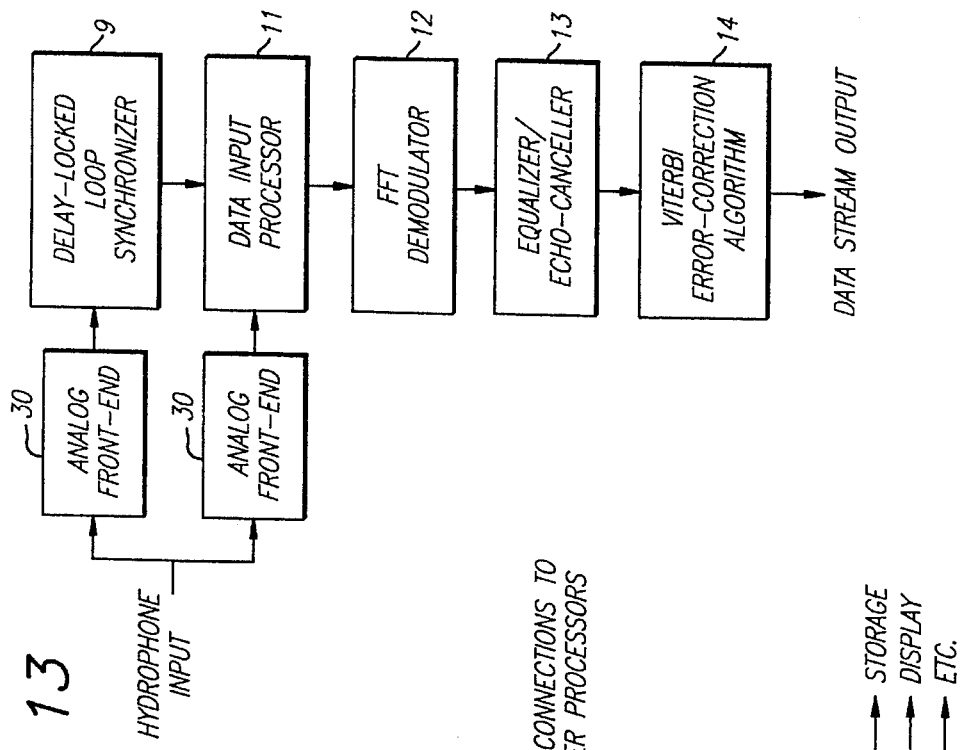
FIG. 13 is a block diagram of the acoustic telemetry receiver algorithms used in the system according to the present invention.

The acoustic telemetry receiver of the present invention is implemented on a network of Inmos Transputers 31 coupled to a multichannel analog data acquisition unit or host 33 as shown in Freitag and Catipovic, "A Signal Processing System for Underwater Acoustic ROV Communication", op cit, and in Catipovic and Freitag, "Spatial Diversity Processing For Underwater Acoustic Telemetry", *IEEE Journal of Oceanic Engineering*, op cit. The system serves as a programmable multichannel data acquisition system. The analog front-end modules 30 shown in FIG. 3 are completely controlled and programmed by the processors. The programmable elements include: bandpass filter 32, amplifiers and demodulator 34, lowpass filters 36 and 38 and digitizers 40 and 42. FIG. 13 is a block diagram of the basic algorithms which are used in the described embodiment of the present invention.

The present invention implements incoherently demodulated MFSK signalling. The transmitter sends 128 tones simultaneously in the 15–35 kHz data band, a net data rate of 10 kbits/sec. The number of tones used results from a tradeoff between system sensitivity to multipath and associated equalizer convergence issues, Doppler sensitivity and practical implementation constraints. Spacing the FSK tone bins by 78.8 Hz (i.e. 12.8 msec) has several advantages. One, it is robust in terms of fading due to channel micro-multipath; two, only low-order equalizers are required; and three, frame synchronization requirements are eased due to the 12.8 msec frame length. The 78.8 Hz tone spacing allows digital Doppler-tracking when needed for high (greater than 2 knot) vehicle velocities as shown in Freitag and Catipovic, "A Signal Processing System for Underwater Acoustic ROV Communication", op cit, and in J. Catipovic and A. B. Baggeroer, "Analysis of High Frequency Multitone Transmissions Propagated in the Marginal Ice Zone", *J. Acoust. Soc. Amer.*, May 1990.

The spatial diversity processing system of the present invention consists of a number of single diversity receivers, as shown in Freitag and Catipovic, "A Signal Processing System for Underwater Acoustic ROV Communication" op cit, coupled to a diversity processor which combines individual receiver outputs and the available side information on channel reliability. Single diversity receivers each comprise two analog channels and a set of processors as shown in FIG. 13. As currently implemented, one analog front-end 30 and processor pair is devoted to synchronization, and another front-end 30 and processor pair handles the actual data as shown in Freitag and Catipovic, "A Signal Processing System for Underwater Acoustic ROV Communication", op cit.

This allows easy use of different frequency bands and sampling rates for the synchronization and data signals. An extended delay-lock loop synchronization algorithm is implemented on a single transputer as delay-locked loop synchronizer 9, and it provides the data input processor 11 with frame arrival estimates. After a data frame is collected, it is passed to FFT Demodulator 12, a processor which recovers the MFSK signal by performing a FFT. Depending on the acoustic channel, an equalizer/echo canceler 13 may be inserted into the processor pipeline at this point, otherwise the output of the FFT 12 is passed to an error-correction algorithm. Convolutional forward error correction is used to increase link reliability. A Viterbi Algorithm (VA) which runs in real-time at constraint length five, rate one-half is used. When operating as a diversity receiver instead of a self-contained system, the VA of the present invention is configured as a raw data error rate estimator, providing a channel reliability estimate to the diversity processor as shown in J. Catipovic and L. Freitag, "Spatial Diversity Processing for High Data Rate Underwater Acoustic Telemetry", to be submitted to the IEEE Journal of Oceanic Engineering.

In accordance with the present invention, outputs from individual diversity receivers are combined by the weighting and combining diversity processor 24, shown in FIG. 2 and discussed below. The processor implements an optimal weighted diversity processor using individual receiver frame synchronization outputs and error rate estimates.

The ocean acoustic channel, particularly in shallow water and environments encountered by ROVs, is a highly reverberant, fully saturated propagation medium. In addition, noise processes and signal reception problems caused by vehicle motion and tracking difficulties combine to produce a rapidly time-variant communication channel. The spatial extent of many noise generators such as bubble plumes, and the spatial coherence of the received channel fluctuations, are often on the order of several meters, suggesting that a reliability increase is achievable through receiver diversity processing. The diversity receiver of the present invention processes several independently corrupted replicas of the transmitted signal to obtain an optimal estimate of the transmitted data by combining weighted estimates of the incoming data sequences as shown in Wozencraft and Jacobs, *Principles of Communication Engineering*, op cit, and in Kennedy, *Fading Dispersive Communication Channels*, op cit. When the average path strengths are not equal, the optimal receiver of the present invention weighs each path contribution by the mean path SNR before summing and may discard very poor paths as shown in Izzo and Paura, "Asymptotically Optimum Space-Diversity Detection in a Non-Gaussian Noise", *IEEE Transactions on Communications*, op cit. An extreme path reliability criterion results in the often-used maximum selection diversity receiver, where only the path with the highest instantaneous SNR or maximum output at the demodulator is used in the decision process. The degradation due to this implementation in Rayleigh fading environment is not severe as shown in Chyi, Proakis, and Keller, "On the symbol error probability of maximum selection diversity reception schemes over a Rayleigh fading channel", *IEEE Transactions on Communications*, op cit.

Most diversity implementations and analyses deal with explicit system diversity, where the available transmitter power is optimally divided among several diversity channels. The fluctuation characteristics of underwater acoustic propagation allow implicit diversity implementations, where the added diversity paths are obtained by processing independently propagating replicas of the transmitted signal, and path signal power is independent of the total number of diversity paths as shown in J. Catipovic and L. Freitag, "Spatial Diversity Processing For Underwater Acoustic Telemetry", *IEEE Journal of Oceanic Engineering*, Vol. 16, No. 1, January 1991.

There are several reasons for incorporating spatial diversity processing into the acoustic telemetry system of the present invention. A single hydrophone may become unusable due to local noise sources and cause the link to go down for an unacceptable amount of time. Also, due to the independent nature of propagating signals and noise, combining several versions of the received data provides additional error rejection and yields an implicit coding gain, particularly valuable when acoustic power must be minimized because of intercept concerns as shown in E. W. Chandler and G. R. Cooper, "Low Probability of Intercept Performance Bounds for Spread-Spectrum Systems", *IEEE Journal on Selected Areas in Communications*, Vol. SAC-3 No. 5, pp. 706–713, September 1985. In the present invention, use of a weighted combining method, as shown in Chase, "Code Combining—A Maximum Likelihood Decoding Approach for Combining an Arbitrary Number of Noisy Packets", *IEEE Transactions on Communications*, op cit, based on estimated channel signal quality provides increased normal operation reliability, protection against a complete hydrophone failure, and further reduces the required acoustic signal level in the water.

Diversity reception is generally undesirable on non-fluctuating channels, as diversity combining invariably introduces additional noise or combining loss into the demodulator statistics. However, when the noise is not additive Gaussian and is uncorrelated between sensors, a processing gain is achievable as shown in Catipovic and Freitag, "Spatial Diversity Processing For Underwater Acoustic Telemetry", *IEEE Journal of Oceanic Engineering*, op cit. The underwater acoustic telemetry system of the present invention, exploits implicit channel diversity even in a non-fluctuating environment. Here the problem of interest is that of a ship following a rapidly maneuvering ROV, and noise mechanisms such as bubble clouds, impulsive hull noise and wake turbulence degrade signal quality and may completely mask it. However, all of these are inherently local phenomena and well mitigated with the spatial diversity system of the present invention.

The bubble distribution under a breaking wave and the resultant noise field (generated by bubble resonances) is described in Farmer and Vagle, "Waveguide Propagation Of Ambient Sound In The Ocean-Surface Bubble Layer", *J. Acoust. Soc. Amer.*, op cit. The bubble plume dimensions are on the order of 10 meters and the plume generally remains in position for several seconds. During this time, a hydrophone within the plume may be assumed to be inoperative because of sound scattering and attenuation by the bubbles. A ship acts as a major source of bubble plumes, but the problem is quite specific to the motion and type of the vessel, as well as the ambient sea state. It is best to assume however, that any hydrophone near a hull will be occasionally subjected to bubble plumes.

Impulsive noise caused by hull slamming, shipboard activities or nearby events such as pile-driving typically corrupt telemetry transmissions through sheer power as shown in Baggeroer, "Acoustic telemetry—an overview," *IEEE Journal of Oceanic Engineering*, op cit. Fortunately they are often propagating in a direction different from the desired waveform and they interact with different data packets at various receivers. Consider an MFSK data packet containing 128 tones (i.e. 128 data bits) that is 10 ms in duration and an impulsive event of similar length. The spatial extent of each event is then 15 m. If two hydrophones are spaced such that the difference of differential travel times for the noise event and the data is greater than 20 ms, the two receivers record the noise waveform interacting with different data packets. The receiver then must identify each bad data packet and weigh the received information properly. If three hydrophones can be placed such that they form an approximate equilateral triangle, operation in presence of out-of-plane noise sources improves.

Wake turbulence and the entrained bubble stream can be severe problems if a recently generated wake is between the source and receiver as might occur when the ship suddenly backs down, turns sharply, or gets ahead of the vehicle. At this time, most of the forward looking transducers become inoperative. The diversity system of the present invention may either employ a set of transducers dedicated to such events, for instance by towing a deep transducer platform, or a sonobuoy can be deployed for operations requiring complex maneuvering. The sonobuoy receiver can be interfaced to the data processor at all times, and the system will seamlessly begin using the new data channel when the data quality is sufficiently high. This allows precautionary measures to be taken during critical operation, and also allows the ship to leave station for short intervals.

At any given time, one or more of the receivers on a tracking ship may be inoperable because of ambient noise or signal shading. Straightforward summing of all hydrophone inputs is precluded because of jammer or channel-induced noise levels present at some receivers. Thus, in order to properly utilize the data received by the different hydrophones, some method must be used for either selecting or selectively combining individual path contributions. Traditionally used approaches mentioned above such as maximum output or maximum SNR selection are not useful because of non-Gaussian noise characteristics as shown in Catipovic and Freitag, "Spatial Diversity Processing For Underwater Acoustic Telemetry", *IEEE Journal of Oceanic Engineering*, op cit.

The code combining diversity approach developed by Chase and described in Chase, "Code Combining—A Maximum Likelihood Decoding Approach for Combining an Arbitrary Number of Noisy Packets", *IEEE Transactions on Communications*, op cit, results in a realizable and practical implementation. The receiver operates on a convolutionally encoded data stream and computes a reliability measure by noting the percentage of bit errors corrected by a decoder operating on a single channel. The raw data stream and error probability estimate from each channel are passed to the code combining and redecoding the data as shown in Chase, "Code Combining—A Maximum Likelihood Decoding Approach for Combining an Arbitrary Number of Noisy Packets", *IEEE Transactions on Communications*, op cit, and in Catipovic and Freitag, "Spatial Diversity Processing For Underwater Acoustic Telemetry", *IEEE Journal of Oceanic Engineering*, op cit. The complete system of the present invention which utilizes this method is described below.

Referring now again to FIG. 2, the spatial diversity receiver 28 of the present invention has to monitor the input channels, assign each a signal reliability measure reflecting the average data quality over a short period, and then optimally combine the multichannel data to obtain a single decoded message. The diversity receiver 28 is made up of L different units identical to the single diversity subsystems described above with regard to the block diagram shown in FIG. 13, but each now also has an algorithm block which computes the reliability index, or estimated error probability, for its incoming data. The Viterbi algorithm in a particular subsystem is now only used to estimate the error probability. The individual units all pass their raw data block and reliability index to a central processor which actually performs the combining and subsequent decoding. This section discusses the diversity receiver, in particular frame synchronization issues and the reliability index, in more detail.

Frame synchronization is a problem because the spatial aperture of the receiver is several packets long. A 10 ms data frame is 15 m long in the water while a typical ship can easily deploy two hydrophones 50 m apart. The incoming data on two channels has a time offset proportional to the hydrophone separation along the propagation axis. While the problem could be overcome by tracking the directions to the source and hydrophone positions, the telemetry receiver of the present invention implements an independent extended delay-lock loop (DLL) at each channel as shown in W. M. Bowles, "Correlation Tracking", Ph. D. Thesis, MIT, June 1981. The DLL tracks a synchronization waveform inserted into the data sequence every 150 ms and interpolates data frame start times between the synch frames. The 150 ms delay spacing gives unambiguous frame synchronization for hydrophone spacings up to 50 m. larger apertures, such as those gained from widely-spaced towed arrays, are easily accommodated by using differential delay times between individual elements. The individual synchronizer outputs are used by the FFT demodulators 12 to frame and compute the demodulated signal for subsequent error correction decoding.

In the present invention a Viterbi algorithm (VA) attempts to correct the incoming data stream at each data channel. The resulting percentage of corrected symbols is used as an indication of data quality as shown in Chase, "Code Combining—A Maximum Likelihood Decoding Approach for Combining an Arbitrary Number of Noisy Packets", *IEEE Transactions on Communications*, op cit. If equalizer/echo canceler 13 is used, it is implemented at this stage, because the channel impulse response and its fluctuations differ among the diversity receivers. The diversity processor requires an estimate of individual channel data quality. As discussed above, metrics such as SNR and demodulator output level are not useful in the ocean acoustic channel because of the non-Gaussian nature of the noise and interference. However, a channel bit error rate is closely related to the signal quality. For the Rayleigh fading channel the error probability is $$P(\epsilon) = \frac{1}{2 + SNR}$$

where SNR is the signal to noise ratio per bit. The code combining diversity formulation due to Chase uses P(e) directly for diversity weighting. The diversity weighting term for the kth data frame is described in Chase, "Code Combining—A Maximum Likelihood Decoding Approach for Combining an Arbitrary Number of Noisy Packets", *IEEE Transactions on Communications*, op cit, and is $$wk = \ln\left(\frac{1 - P(\epsilon)_k}{P(\epsilon)_k}\right).$$

The frame error probability P(e) is estimated by monitoring the percentage of bits corrected by the VA, and the estimate improves with decoder constraint length. As was noted above, the constraint length of the VA decoder is limited by the computational capacity of the receiver.

Figure 14:
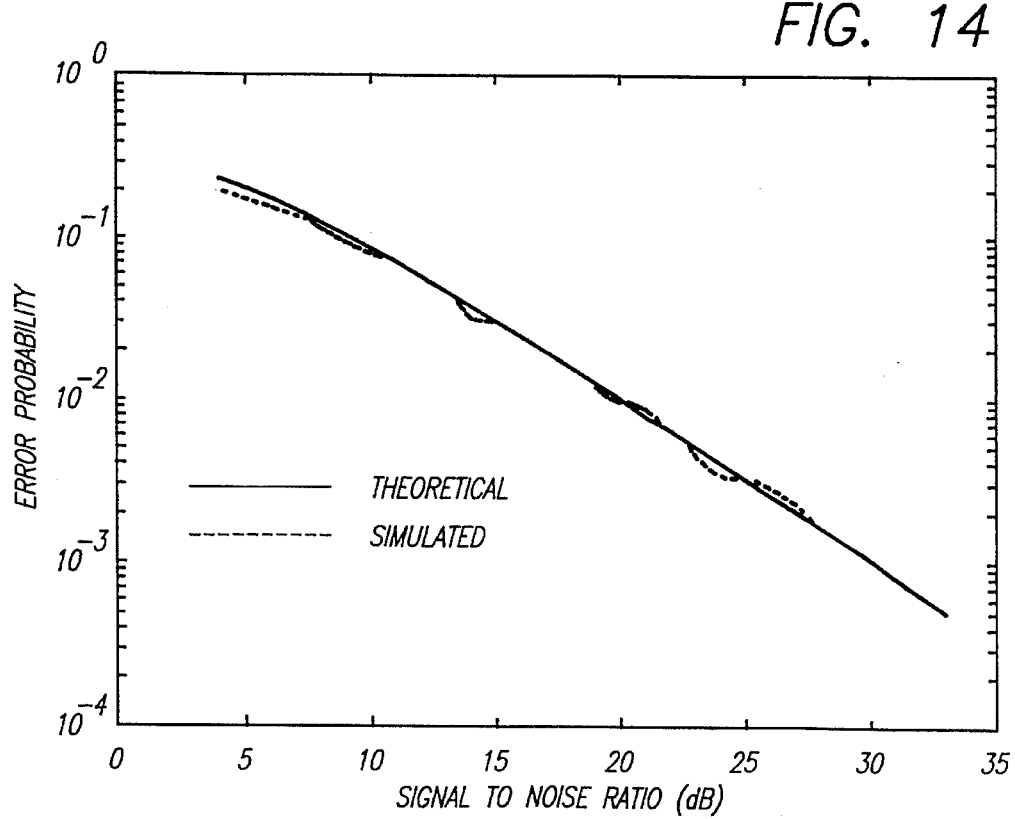
FIG. 14 is a graphical comparison of true bit-error rate and a Monte Carlo simulation of a Viterbi algorithm estimator.
Figure 5C:
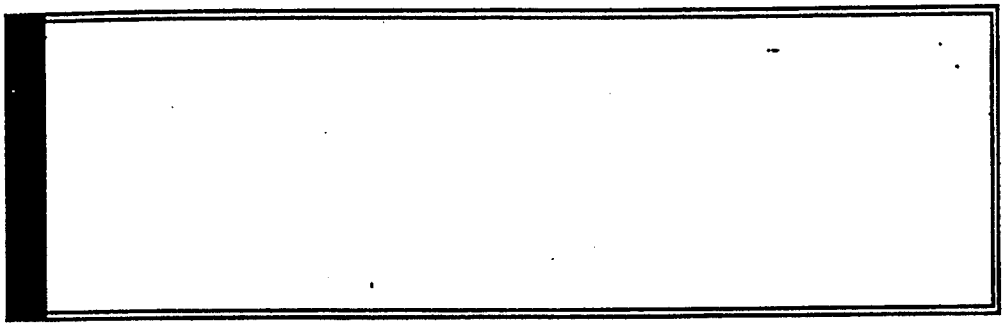
FIG. 5A, FIG. 5B and FIG. 5C are time-frequency error patterns from receivers spaced 0.25 m apart operating under quiet acoustic conditions.
Figure 5B:
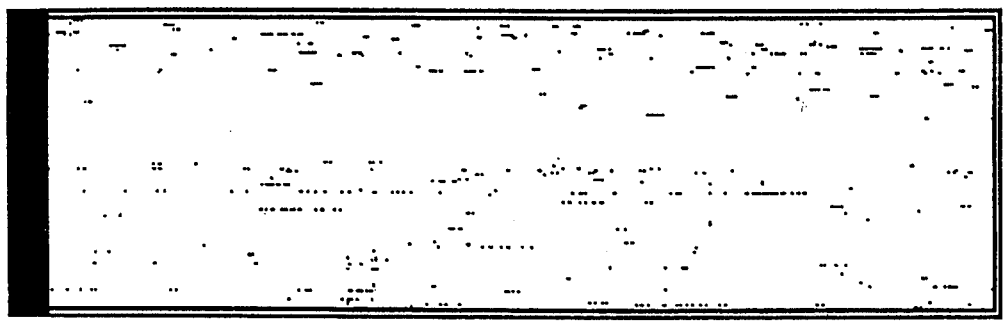
Figure 5A:
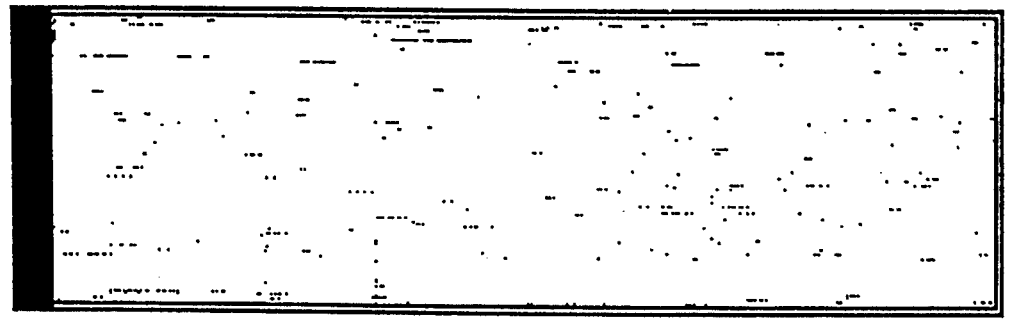

The percentage of corrected bits is closely related to the raw data bit error rate; during high data quality, most errors are corrected, and the two rates approach each other as SNR increases. At lower SNR, a significant number of errors are not corrected, but the VA also makes needless corrections. The number of corrected errors is actually a lower bound to the true error rate, as shown in FIG. 14 where the results of a Monte-Carlo simulation for the average number of corrected bits versus SNR are shown for a Rayleigh fading incoherently demodulated signal.

The code combiner of the present invention operates on the demodulator (FFT 12) outputs of each channel. The outputs are weighted by the error rate estimates or erased (weighted by 0) for channels where the synchronizer is out of lock. The code combiner time shifts and adds the weighted channel demodulator outputs, and uses the result as input to the data decoder, which consists of a VA identical to the channel error rate estimators. Note that the raw demodulator outputs, and not individual VA outputs, are used at this stage. The output of this second VA is the final data stream.

In order to evaluate the spatial diversity technique for acoustic telemetry embodied in the present invention, experiments were done in Woods Hole harbor over a shallow (6 to 20 meters deep) range 750 meters long. A low-power acoustic source broadcast a CW signal made up of 128 frequencies spaced across 20 kHz in the band from 15 to 35 kHz. A CW signal was used so that the errors due to synchronization and inter-symbol interference from multipath would not be present for these tests. In order to analyze the data blocks as both coded and uncoded, the all-zero sequence was transmitted. This allowed direct comparison of coded versus uncoded results on the same data block, and allowed the improvement due to coding to be measured. The transmitter was set up on a large moored platform in the harbor, and two omnidirectional receive hydrophones were spaced 20 meters apart and two meters deep at the edge of the dock.

For this series of experiments, data were collected in six second blocks. Uncoded operation using 20 kHz of bandwidth yielded an uncoded 10,000 bit per second data rate. A rate one-half code reduced throughput to 5,000 bits per second. The total number of uncoded bits for each data block was 64,000.

Figure 15:
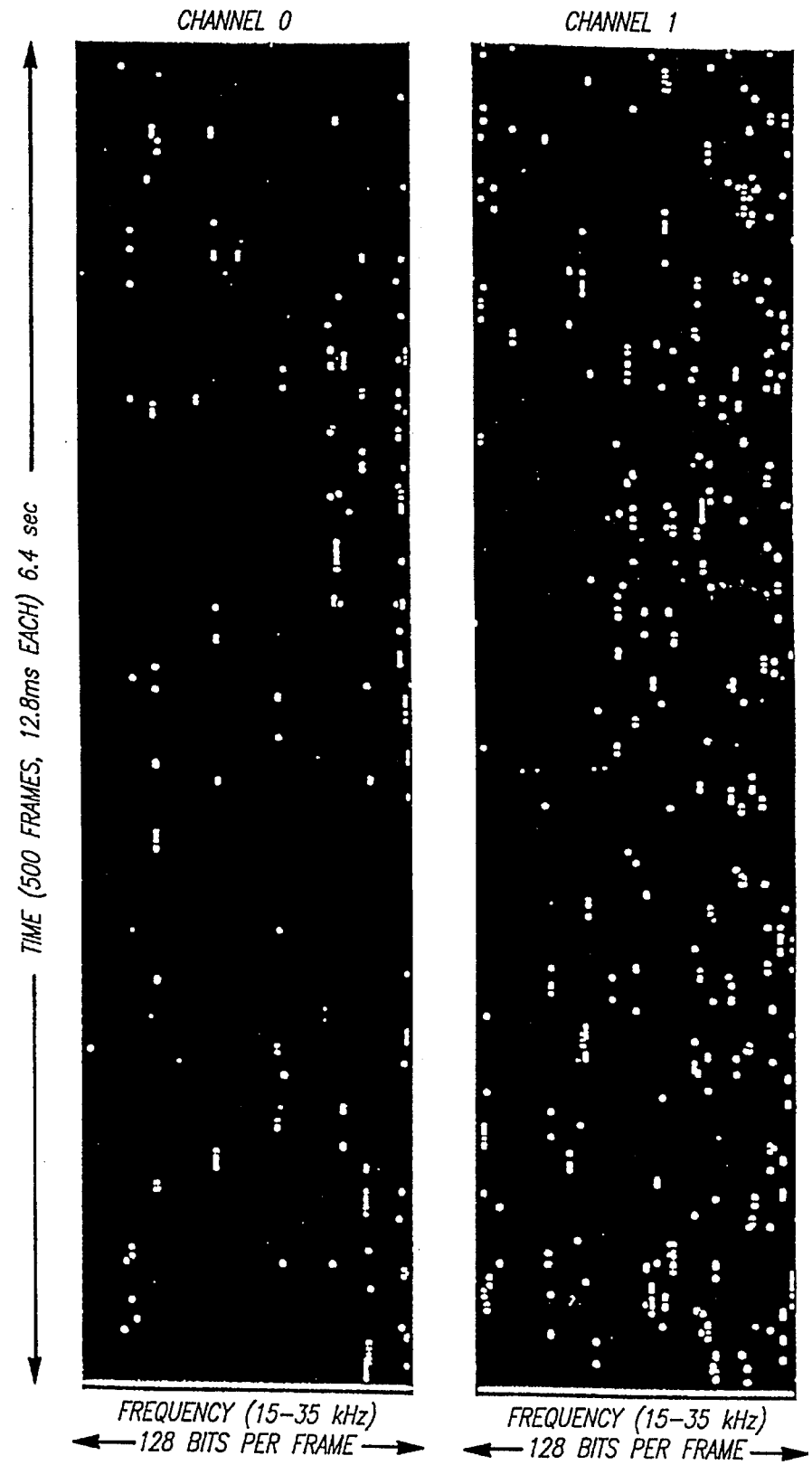
FIG. 15 is time-FSK bit error plots for two channels under good conditions.
Figure 16:
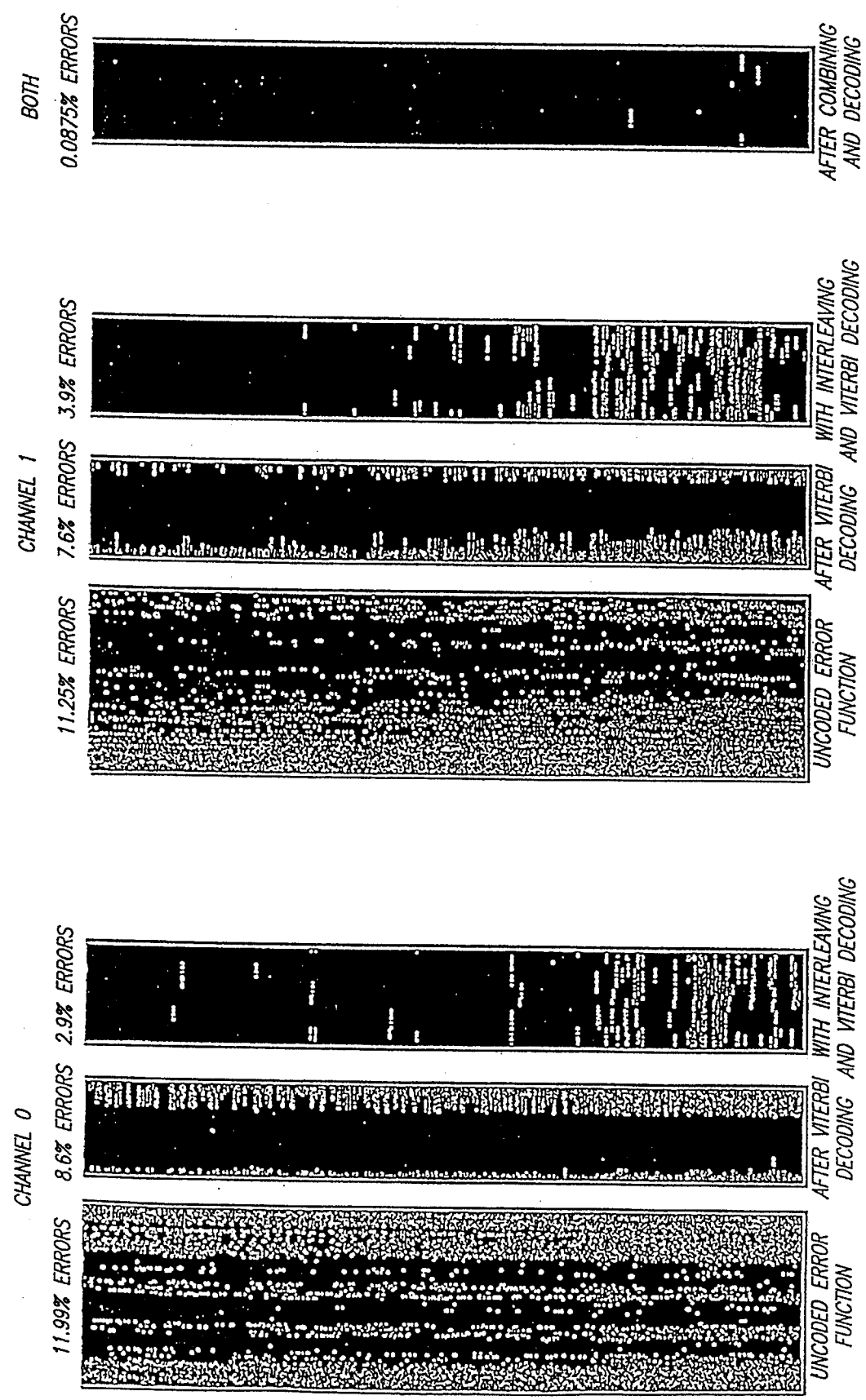
FIG. 16 is time-FSK bit error plots for two channels operating while an interfering noise source is approaching.

To provide a graphical representation of the wideband acoustic channel over time, plots of bit errors in time-frequency format are used. Each horizontal trace in FIGS. 15 and 16 is a frame consisting of 128 data bits which correspond to the 128 FSK frequencies transmitted. A white block indicates that the bit was received in error. The vertical axis is time; received frames are stacked on top of each other, time zero at the top. The frame duration is 12.8 ms, so 500 frames provides 6.4 seconds vertically. Interpretation of the plots is straightforward: vertical tracks of errors correspond to fading behavior in particular frequencies or the presence of interfering noise in that band.

As was described above, diversity under normal conditions provides an extra level of error protection because both fading behavior and noise propagation are uncorrelated spatially even over short distances. This is demonstrated in FIG. 15 where error plots from two simultaneously sampled channels are shown. Data from channel 0 is better than that from channel 1 (261 errors, error probability 0.4% as opposed to 478 errors, 9.75%), but both channels correct to zero errors using the Viterbi decoder.

Of more interest is the raw uncoded error pattern after the two channels are combined. Both equal weighted and reliability weighted combining was performed, and the results from each were similar. When the two channels were combined without weighting, the total number of raw errors dropped to 4. When weighted combining was done (using actual error probabilities rather than estimates in order to get a lower bound), the total number of uncoded errors dropped to 3, an error probability of 0.0047%. This would not require a very complex code to correct. Thus for the case with no interference at specific frequencies (no natural or man-made jammers), random errors due to fading are virtually uncorrelated from channel to channel, and data reliability is increased by using multiple hydrophones. This shows that under moderate channel conditions, spatial diversity as implemented in the present invention may be used to significantly reduce the code complexity required. For example, a rate seven-eighths code might be used instead of a rate one-half code. For a system that starts with a raw rate of 10,000 bits per second this would yield 8,750 bits per second rather than 5,000 bits per second actual throughput.

Another case of interest is where a noise source causes interference on all hydrophones, but because of differences in the spatial properties of the noise field and the transfer function of the data signal, the time-frequency error function is not the same. An example of a case such as this is shown in FIG. 16. This bit error plot is from data taken while a small craft traveling at high speed was approaching the hydrophones. The data was collected only five minutes after the good data set shown in FIG. 15. As may be seen by examining the uncoded error plots, the result of the interference differs markedly between the two receiving hydrophones. The uncoded error rate on the raw data channels (11.99% and 11.25% respectively) was high enough so that the rate one-half, constraint length 5, Viterbi algorithm was unable to provide error-free output. As shown in FIG. 16, after passing each data set through the VA, the error rates only reduced to 8.6% and 7.6%. The time-frequency error plots of the data after decoding demonstrates the difficulty the VA has with numerous closely spaced errors. The middle portion of the raw data spectrum where there are few errors become error-free in the decoded data, but the dense error regions are beyond the correction capacity of the decoder.

A decoder like that used in the present invention works best when the error patterns are white and when there are few bursts of errors longer than the constraint length. To gain a level of improvement by whitening the received frame, an interleaver was used. The interleaver alternated bits from the low and high frequency halves of the band in an attempt to balance out the correction load on the decoder. There are many methods for interleaving, and this very simple scheme was used only to get a first order reduction in error clustering. After interleaving and decoding the error rates were reduced to 2.9% and 3.9%, about twice as good as before interleaving. Note that the error patterns are much different now. The decoder was able to correct many more errors in the topmost part of the plot (earlier in time), but as channel quality degrades, it becomes more and more difficult for it to cope. In the lower portion of the plot, performance seems slightly worse than before interleaving. This is because previously the center portion of a frame was correctable. Interleaving places poor data in amongst the good, and overall quality across the frame becomes too low for the decoder.

While interleaving has helped to reduce the error rate, the output (3 to 4 percent errors) is still too poor to be useful in most applications. In order to function under these conditions, a lower rate code or much higher constraint length would have to be used. However, a lower rate code would decrease link capacity further, and real-time correction becomes prohibitive for the long constraint lengths needed under circumstances such as this. As is shown below, combining multiple channels is a very effective way of increasing data reliability without reducing the data rate of the acoustic communication link.

When as in the present invention the interleaved channels are combined, either weighted or unweighted, the total number of errors is greatly reduced. If the two data blocks being analyzed here are added directly, the total number of errors is reduced to 47 (0.15% errors), about 20 times better than the best channel after interleaving. When the frames are weighted, then combined, the error rate reduces to 0.0875%. This is over one hundred times better than the best uncoded data channel. These results are quite impressive starting with two channels of data, the best of which has an error rate of over 11%, a data stream with less than a tenth of one percent bit errors has been extracted.

As might be expected, this method also works quite well under conditions where one hydrophone is providing very poor or no data, and another is functioning well. To show that weighted combining works under these conditions (where simply adding channels would not), data were taken when one hydrophone was exposed to noise from a ferry boat, and the other partially shielded from the noise by the dock. The exposed channel had a raw error rate of almost 17%, and the good channel 2.4%. The data sets were processed exactly as above: the data was interleaved then added together after weighting. The result was zero errors in the data output, demonstrating that weighted combining does not degrade the good data. This is a situation where combining without weighting would yield a much worse output than selecting the best channel.

These results indicate that spatial diversity as embodied in the present invention is a very successful method for 10 kbit/sec underwater acoustic telemetry from moving vehicles. While less robust links can be made operational for a stationary source-receiver configuration, maneuvering interference and tracking difficulties warrant the multiple receivers and robust modulation/coding method embodied in the present invention. The spatial diversity system of the present invention is shown to improve data link reliability in all operating conditions, replacing or reducing the need for error correction and its attendant data rate reductions for quiet channel conditions. During intense jamming or ambient noise conditions, a combination of spatial diversity processing, interleaving and forward error correction as embodied in the present invention is shown to allow uninterrupted operation.

We claim:

1. An underwater telemetry system, comprising:

multiple spatially diverse hydrophones;

means associated with a first one of said spatially diverse hydrophones for receiving underwater acoustic signals transmitted from an underwater acoustic: source along a first path;

means associated with a second of said spatially diverse hydrophones for receiving underwater acoustic signals transmitted from said underwater acoustic source along a second path, said second path being spatially diverse from said first path;

means for determining an estimate of the relative reliability of the underwater acoustic signals received along said first and second paths;

means for weighting the received underwater acoustic signals in accordance with said reliability estimate; and means for combining said weighted underwater acoustic signals to recover an accurate representation of the underwater acoustic signals transmitted from said underwater acoustic source.

2. The invention of claim 1 wherein said means for receiving underwater acoustic signals along said first and second paths further comprises:

means for synchronizing the underwater acoustic signals received along said first and second paths.

3. The invention of claim 2 further comprising:

means for correcting errors in the underwater acoustic signals received along each of said paths.

4. The invention of claim 3 wherein said estimate determining means further comprises:

means for determining an estimate of the reliability of the signals received along one of said paths inversely related to the number of errors corrected in the signals received along that path.

5. The invention of claim 4 wherein the means for weighting the underwater acoustic signal received along a particular path further comprises:

means for weighting the error corrected signals received along that particular path in accordance with the number of errors corrected in the signals received along that path.

6. The invention of claim 2 further comprising:

echo canceling means for comparing signals received along each of said paths to cancel multi-path errors.

7. The invention of claim 1 wherein said underwater acoustic signals are digital signals transmitted at a plurality of predetermined frequencies and said means for determining an estimate further comprises:

means for correcting errors in the signals received along each of said paths; and means for determining a reliability estimate for each path in response to the errors corrected in said path.

8. The invention of claim 1 wherein said underwater acoustic signals are digital signals transmitted at a plurality of predetermined frequencies and the means for combining further comprises:

means for synchronizing the signals received along said first and second paths; and echo cancelling means for comparing signals received along each of said paths to cancel multi-path errors.

9. An underwater telemetry system, comprising:

a plurality of spatially diverse hydrophones for receiving signals transmitted underwater;

an analog processor associated with each of said hydrophones for recovering signals therefrom;

a reliability estimator associated with each of said analog processors for estimating the reliability of the signals received by each of said hydrophones;

means for combining the recovered digital signals in accordance with the estimate of reliability associated therewith; and means for correcting the combined recovered digital signals to recovery a replica of the originally transmitted signals.

10. The invention of claim 9, wherein each of the analog processors further comprises:

means for separating the signals received by each hydrophone into first and second quadrature channels;

low pass filter means in each quadrature channel for blocking signals above a predetermined frequency;

means responsive to each low pass filter means for converting the analog signals passing therethrough into digital signals; and means for combining the quadrature channels associated with each hydrophone into a single channel associated with that hydrophone.

11. The invention of claim 10, wherein each reliability estimator further comprises:

fast Fourier transform means for transforming the signals received from time domain into frequency domain signals;

Viterbi algorithm means for correcting the frequency domain signals to produce corrected signals;

means for decoding the frequency domain signals to produce uncorrected signals; and means for combining the corrected and uncorrected signals to determine the number of errors in the uncorrected signals.

12. The invention of claim 10, wherein the means for recovering a replica of the transmitted signals further comprises:

Viterbi algorithm means for correcting the combined and weighted signals.

13. A method of underwater telemetry comprising the steps of:

receiving acoustic signals transmitted from a single source underwater in a plurality of frequency channels along a plurality of paths leading to a plurality of spatially diverse hydrophones;

determining an estimate of the reliability of the signals received along each of said paths; and combining said signals received along each of said paths in accordance with the estimate of reliability associated therewith to recover a replica of the signals transmitted by the source.

14. The method of claim 13, wherein the step of receiving the acoustic signals along each path further comprises the steps of:

band pass filtering the signals received by each hydrophone to limit the signals to be further processed;

separating the signals to be processed into a pair of quadrature channels;

low pass filtering the signals being processed in each quadrature channel;

converting the low pass filtered signals in each quadrature channel into digital signals; and recombining the signals from each pair of quadrature channels.

15. The invention of claim 13, wherein the step of determining the estimate of reliability further comprises the steps of:

transforming the acoustic signals received along each path from time domain to frequency domain signals;

decoding the frequency domain signals to produce raw digital data signals;

correcting the frequency domain signals to produce corrected digital data signals; and estimating the reliability of the raw digital signals in comparison with the corrected digital signals.

16. The invention of claim 15, wherein the step of correcting the signals further comprises the step of:

applying a Viterbi algorithm to the frequency domain signals to produce the corrected digital data signals.

17. The invention of claim 13, wherein the step of combining the signals to recover a replica of the signals transmitted by the source further comprises the steps of:

weighting the signals received along each path in accordance with the estimate of reliability associated with that path;

combining the weighted signals; and then correcting the combined signals in accordance with a predetermined algorithm to recover the replica of the transmitted signals.

18. The invention of claim 17, wherein the step of correcting the combined signals further comprises the step of:

applying a Viterbi algorithm to the combined signals to recover the replica of the transmitted signals.

* * * * *